United States Patent
Futa et al.

(10) Patent No.: US 7,940,927 B2
(45) Date of Patent: May 10, 2011

(54) INFORMATION SECURITY DEVICE AND ELLIPTIC CURVE OPERATING DEVICE

(75) Inventors: Yuichi Futa, Osaka (JP); Natsume Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 872 days.

(21) Appl. No.: 11/912,112

(22) PCT Filed: Apr. 25, 2006

(86) PCT No.: PCT/JP2006/308598
§ 371 (c)(1),
(2), (4) Date: Oct. 19, 2007

(87) PCT Pub. No.: WO2006/118092
PCT Pub. Date: Nov. 9, 2006

(65) Prior Publication Data
US 2009/0074179 A1 Mar. 19, 2009

(30) Foreign Application Priority Data

Apr. 27, 2005 (JP) ................................. 2005-129273

(51) Int. Cl.
*H04K 1/00* (2006.01)
*H04L 9/28* (2006.01)
*G06F 7/58* (2006.01)
(52) U.S. Cl. .......... 380/28; 380/255; 708/250; 708/400
(58) Field of Classification Search .................... 380/28, 380/255; 708/250, 400
See application file for complete search history.

(56) References Cited

U.S. PATENT DOCUMENTS

| 6,738,478 | B1 | 5/2004 | Vanstone et al. |
| 6,876,745 | B1 | 4/2005 | Kurumatani |
| 7,418,099 | B2 * | 8/2008 | Vanstone et al. ................ 380/28 |
| 2001/0048741 | A1 | 12/2001 | Okeya |

FOREIGN PATENT DOCUMENTS

| GB | 2 403 308 | 12/2004 |
| JP | 2000-187438 | 7/2000 |

(Continued)

OTHER PUBLICATIONS

International Search Report issued Jul. 18, 2006 in the International (PCT) Application of which the present application is the U.S. National Stage.

(Continued)

*Primary Examiner* — Michael Pyzocha
(74) *Attorney, Agent, or Firm* — Wenderoth, Lind & Ponack, L.L.P.

(57) ABSTRACT

Resistance against simple power analysis is maintained while a smaller table is used. An IC card 100 decrypts encrypted information using elliptic curve calculation for calculating a point k*C by multiplying a point C on an elliptic curve E with a coefficient k that is a positive integer less that a prime p. The calculation of the point k*C is performed by adding a multiplication result obtained by multiplying a digit position (window) value w of the acquired coefficient k with the point C in a position corresponding to the digit position, and is performed with respect to all digit positions. When a non-negative integer t exists that fulfills a condition that the acquired digit value w_can be divided by $2^t$ and cannot be divided by $2^{t+1}$, the multiplication includes adding a point obtained by multiplying a point Q with $w/2^t$.

16 Claims, 16 Drawing Sheets

FOREIGN PATENT DOCUMENTS

| | | |
|---|---|---|
| JP | 2001-337599 | 12/2001 |
| JP | 2002-528771 | 9/2002 |
| JP | 2003-233307 | 8/2003 |
| JP | 2005-20735 | 1/2005 |

OTHER PUBLICATIONS

Kocher, Timing Attacks on Implements of Diffie-Hellman, RSA, DSS, and Other Systems, *CRYPTO* '96, LNCS 1109, pp. 104-113, 1996.

Kocher et al., "Differential Power Analysis", Advances in Cryptology—CRYPTO '99, LNCS 1666, pp. 388-397, 1999.

Miyaji et al., "Efficient elliptic curve exponentiation", *ICICS* '97, pp. 282-291, 1999.

Blake et al., "Elliptic Curves in Cryptography", *London Mathematical Society Lecture Notes*, Series 265, Cambridge University Press, 1999.

Mamiya et al., "SPA-resistant method by using Fixed-Hamming-Weight Representation", *Technical Report of IEICE*, pp. 55-60 (including English translation), 2006.

* cited by examiner

FIG. 12

CALCULATION CONVERSION TABLE ~320

| w_c | CONVENTIONAL WINDOW CALCULATION | WINDOW CALCULATION BY SCALAR MULTIPLE CALCULATION UNIT | BASIC CALCULATION ORDER | NUMBER OF BASIC CALCULATIONS |
|---|---|---|---|---|
| 0 | $R \leftarrow 2^3 R$ | $R \leftarrow 2^3 R, D \leftarrow R+C$ | DOUBLE→DOUBLE→DOUBLE→DUMMY ADD | 4 |
| 1 | $R \leftarrow 2^3 R+C$ | $R \leftarrow 2^3 R+C$ | DOUBLE→DOUBLE→DOUBLE→ADD | 4 |
| 2 | $R \leftarrow 2^3 R+2C$ | $R \leftarrow 2(2^2R+C)$ | DOUBLE→DOUBLE→ADD→DOUBLE | 4 |
| 3 | $R \leftarrow 2^3 R+3C$ | $R \leftarrow 2^3 R+3C$ | DOUBLE→DOUBLE→DOUBLE→ADD | 4 |
| 4 | $R \leftarrow 2^3 R+4C$ | $R \leftarrow 2^2 (2R+C)$ | DOUBLE→ADD→DOUBLE→DOUBLE | 4 |
| -3 | $R \leftarrow 2^3 R-3C$ | $R \leftarrow 2^3 R-3C$ | DOUBLE→DOUBLE→DOUBLE→ADD | 4 |
| -2 | $R \leftarrow 2^3 R-2C$ | $R \leftarrow 2(2^2R-C)$ | DOUBLE→DOUBLE→ADD→DOUBLE | 4 |
| -1 | $R \leftarrow 2^3 R-C$ | $R \leftarrow 2^3 R-C$ | DOUBLE→DOUBLE→DOUBLE→ADD | 4 |

FIG. 17

CALCULATION CONVERSION TABLE WHEN FOR sw=4
330

| w_c | CONVENTIONAL WINDOW CALCULATION | WINDOW CALCULATION BY SCALAR MULTIPLE CALCULATION UNIT | BASIC CALCULATION ORDER | NUMBER OF BASIC CALCULATIONS |
|---|---|---|---|---|
| 0 | R←$2^4$R | R←$2^4$R, D←R+C | DOUBLE→DOUBLE→DOUBLE→DOUBLE→DUMMY ADD | 5 |
| 1 | R←$2^4$R+C | R←$2^4$R+C | DOUBLE→DOUBLE→DOUBLE→DOUBLE→ADD | 5 |
| 2 | R←$2^4$R+2C | R←2($2^3$R+C) | DOUBLE→DOUBLE→DOUBLE→ADD→DOUBLE | 5 |
| 3 | R←$2^4$R+3C | R←$2^4$R+3C | DOUBLE→DOUBLE→DOUBLE→DOUBLE→ADD | 5 |
| 4 | R←$2^4$R+4C | R←$2^2$($2^2$R+C) | DOUBLE→DOUBLE→ADD→DOUBLE→DOUBLE | 5 |
| 5 | R←$2^4$R+5C | R←$2^4$R+5C | DOUBLE→DOUBLE→DOUBLE→DOUBLE→ADD | 5 |
| 6 | R←$2^4$R+6C | R←2($2^3$R+3C) | DOUBLE→DOUBLE→DOUBLE→ADD→DOUBLE | 5 |
| 7 | R←$2^4$R+7C | R←$2^4$R+7C | DOUBLE→DOUBLE→DOUBLE→DOUBLE→ADD | 5 |
| 8 | R←$2^4$R+8C | R←$2^3$(2R+C) | DOUBLE→ADD→DOUBLE→DOUBLE→DOUBLE | 5 |
| -7 | R←$2^4$R-7C | R←$2^4$R-7C | DOUBLE→DOUBLE→DOUBLE→DOUBLE→ADD | 5 |
| -6 | R←$2^4$R-6C | R←2($2^3$R-3C) | DOUBLE→DOUBLE→DOUBLE→ADD→DOUBLE | 5 |
| -5 | R←$2^4$R-5C | R←$2^4$R-5C | DOUBLE→DOUBLE→DOUBLE→DOUBLE→ADD | 5 |
| -4 | R←$2^4$R-4C | R←$2^2$($2^2$R-C) | DOUBLE→DOUBLE→ADD→DOUBLE→DOUBLE | 5 |
| -3 | R←$2^4$R-3C | R←$2^4$R-3C | DOUBLE→DOUBLE→DOUBLE→DOUBLE→ADD | 5 |
| -2 | R←$2^4$R-2C | R←2($2^3$R-C) | DOUBLE→DOUBLE→DOUBLE→ADD→DOUBLE | 5 |
| -1 | R←$2^4$R-C | R←$2^4$R-C | DOUBLE→DOUBLE→DOUBLE→DOUBLE→ADD | 5 |

INFORMATION SECURITY DEVICE AND ELLIPTIC CURVE OPERATING DEVICE

BACKGROUND OF THE INVENTION

1. Field of Invention

The present invention relates to information security technology for resisting a power analysis attack made by measuring an amount of power consumed, and processing information safely and reliably.

2. Description of the Related Art

In recent years, various types of code cracking techniques have been proposed for, when encryption processing is performed in an encryption module realized by hardware or software, using side information of the encryption processing to analyze the encryption key used in the encryption processing.

One example of such a technique is a code cracking method called timing attack, which finds an encryption key used in encryption processing by exploiting the fact that the amount of time required for encryption processing in an encryption module differs slightly according to the value of the encryption key. Furthermore, code cracking methods called simple power analysis and differential power analysis use the amount of power consumed by the encryption module in encryption processing as side-channel information.

With high-performance measuring devices becoming less expensive in recent years, these code cracking methods are known to be capable of analyzing actual products that are provided with an encryption module, such as IC cards.

Hereinafter, code cracking methods that find an encryption key based on fluctuations in the amount of power consumed by an encryption module in encryption processing as described above, in other words based on a power waveform, are collectively referred to as power analysis attacks. Note that timing attacks are described in detail in Non-Patent Document 1, and power analysis attacks are described in detail in Non-Patent Document 2.

Next, a description is given of simple power analysis of elliptic curve encryption. Note that elliptic curve encryption is described in detail in Non-Patent Document 5, and elliptic ElGamal encryption and the elliptic DSA signature scheme is described in detail in Non-Patent Document 3.

Simple Power Analysis of Elliptic Curve Encryption

In decryption processing in elliptic curve encryption, a scalar multiple ks*C is calculated from a private key ks that is a positive integer and a point C on an elliptic curve that is part of a cipher text. Here, ks*C expresses a point on an elliptic curve obtained by ks points Cs being added together. One example of this kind of calculation method is a signed window method described on page 69 of Non-Patent Document 5. The following describes a signed window method. Note that in the following the width of the window_is 3 bits.

Step S801: let v←ks, and set $v\_0, v\_1, v\_2, \ldots, v\_b$ such that $v=v\_0+v\_1\times2^3+v\_2\times2^6+\ldots+v\_b\times2^{(b\times3)}$. Furthermore, let $v\_(b+1)\leftarrow0$. Here, b denotes (smallest integer equal to or greater than /en/3)−1, len denotes the number of bits of v, "×" denotes multiplying integers, and x^y denotes x raised to the y-th power. As one example, when len=52, b=18−1=17.

Step S802: In the following steps S8021 to S8026, generate integer string $\{w\_i\}(i=1, 2, \ldots, b+1)$.

Step S8021: c←0

Step S8022: Judge whether $v\_c>2^2$. When $v\_c>2^2$, go to step S8023. When not, go to step S8024.

Step S8023: $w\_c\leftarrow v\_c-2^3$, $v\_(c+1)\leftarrow v\_(c+1)+1$, go to step S8025.

Step S8024: $w\_c\leftarrow v\_c$

Step S8025: c←c+1

Step S8026: Judge whether c>b+1. When c>b+1, go to step S803. When not, go to step S8022.

Step S803: In the following steps S8031 to S8035, generate table $\{P\_i\}$.

Step S8031: $P\_0\leftarrow O$, $P\_2\leftarrow\text{Dob}(C)$. Here, O is a zero element of an elliptic curve, Dob denotes doubling on an elliptic curve, and Dob(C) is a point that is double C.

Step S8032: c←3

Step S8033: $P\_c\leftarrow P\_(c-1)+C$

Step S8034: c←c+1

Step S8035: Judge whether $c>2^2=4$. When $c>2^2$, go to step S804. When not, go to step S8033.

Step S804: In the following steps S8041 to S8047, calculate scalar multiple R.

Step S8041: c←b+1

Step S8042: Judge w_c=0. When w_c=0, c←c−1.

Step S8043: $R\leftarrow P\_(w\_c)$

Step S8044: c←c−1

Step S8045: Judge whether c<0. When c<0, go to step S805.

Step S8046: $R\leftarrow\text{Dob}(\text{Dob}(\text{Dob}(P\_(w\_c))))$

Step S8047: Judge whether w_c is positive, negative or 0. When w_c<0, $R\leftarrow\text{Add}(R, -P\_(-w\_c))$. When w_c>0, $R\leftarrow\text{Add}(R, P\_(w\_c))$. When w_c=0, do nothing. Go to step S8044. Here, Add denotes addition on an elliptic curve, and Add$(R, P\_(w\_c))$ is a result of addition of R and $P\_(w\_c)$ on an elliptic curve.

Step S805: Output R and end calculation.

With the above-described method, the scalar multiple is calculated using the integer string $\{w\_i\}$ and the table $\{P\_i\}$. At step S8047, no elliptic curve calculation is performed when w_c=0. Furthermore, at step S8042, when w_c=0, c is decremented without an elliptic curve calculation being performed. As such, there are no elliptic curve calculations in the aforementioned cases. In this way, the processing when w_c=0 and the processing when w_c does not equal 0 are different.

Formulas for Elliptic Curve Doubling and Elliptic Curve Adding

Formulas for elliptic curve doubling and elliptic curve adding are shown below. Details of these formulas can be found in Non-Patent Document 4. In the present description, and elliptic curve calculation (adding and doubling) is performed using Jacobian coordinates as the coordinates of a point.

(a) Elliptic Curve Addition Formula

With respect to P1=(X1, Y1, Z1), .P2=(X2, Y2, Z2), calculate P3=P1+P2=(X3, Y3, Z3).

$$X3 = -H^3 - 2\times U1\times H^2 + r^2$$

$$Y3 = -S1\times H^3 + r\times(U1\times H^2 - X3)$$

$$Z3 = Z1\times Z2\times H$$

Where, $U1=X1\times Z2^2$, $U2=X2\times Z1^2$, $S1=Y1\times Z2^3$, $S2=Y2\times Z1^3$, $H=U1-U2$, $r=S2-S1$.

(b) Elliptic Curve Doubling Formula

For P1=(X1, Y1, Z1), calculate P4=2*P1=(X4, Y4, Z4).

$$X4 = T$$

$$Y4 = -8\times Y1^4 + M\times(S-T)$$

$$Z4 = 2\times Y1\times Z1$$

Where $S=4\times X1\times Y1^2$, $M=3\times X1^2+a\times Z1^4$, $T=-2S+M^2$.

According to the stated calculations, squaring is executed four times and multiplication is executed twelve times in elliptic curve addition, whereas squaring is executed six times and multiplication is executed four times in elliptic curve doubling.

In this way, since the number of times that squaring and multiplication is performed is different between elliptic curve addition and elliptic curve doubling, the waveform of the consumed power in the encryption module is different. Therefore, it is possible to analyze the order of elliptic curve doubling and addition calculation by observing the power waveform. As a result of such observation, an attacker will be able to know whether or not w_c=0, and from information of whether or not w_c=0, will be able to narrow down the search domain for the private key ks.

Conventional Methods of Countering Simple Power Analysis of Elliptic Curve Encryption The described simple power analysis exploits the fact the calculation processing is different when w_c=0. In view of this, attacks can be prevented by adding dummy calculation processing in the case of w_c=0 so that the calculation processing is the same in both the case of w_c=0 and the case of w_c not equaling 0. Specifically, calculation is performed using the following algorithm.

Step S901: let v-ks, and find v_0, v_1, v_2, ..., v_b such that v=v_0+v_1×2^3+v_2×2^6+ ... +v_b×2^(b×3). Furthermore, let v_(b+1)←0. Here, b denotes (smallest integer equal to or greater than /en/3)−1, /en denotes the number of bits of v, "×" denotes multiplying integers, and x^y denotes x raised to the y-th power. As one example, when len=52, b=18−1=17.

Step S902: In the following steps S9021 to S9026, generate integer string {w_i} (i=1, 2, ... b+1).

Step S9021: c←0

Step S9022: Judge whether v_c>2^2. When v_c>2^2, go to step S9023. When not, go to step S9024.

Step S9023: w_c←v_c−2^3, v_(c+1)←v_(c+1)+1, go to step S9025.

Step S9024: w_c←v_c

Step S9025: c←c+1

Step S9026: Judge whether c>b+1. When c>b+1, go to step S903. When not, go to step S9022.

Step S903: In the following steps S9031 to S9035, generate table {P_i}.

Step S9031: P_0←O, P_2←Dob(C).

Step S9032: c←3

Step S9033: P_c←P_(c−1)+C

Step S9034: c←c+1

Step S9035: Judge whether c>2^2=4. When c>2^2, go to step S904. When not, go to step S9033.

Step S904: In the following steps, calculate scalar multiple R.

Step S9041: c←b+1

Step S9042: Judge whether w_c=0. When w_c=0, D←Dob(Dob(Dob(C))), D←Add(R,C), c←c−1.

Step S9043: R←P_(w_c)

Step S9044: c←c−1

Step S9045: Judge whether c<0. When c<0, go to step S905.

Step S9046: R←Dob(Dob(Dob(P(w_c))))

Step S9047: Judge whether w_c is positive, negative or 0. When w_c<0, R←Add(R, −P_(−w_c)). When w_c>0, R-Add (R, P (w_c)). When w_c=0, D←Add (R, C). Go to step S9044. Here, Add denotes addition on an elliptic curve, and Add (R, P_(w_c)) is a result of addition of R and P_(w_c) on an elliptic curve.

Step S905: Output R and end calculation.

In this method of countering the described simple power analysis, D is a dummy point that is unrelated to the calculation result, and calculations of Q executed at step S9042 and step S9047 are dummy calculations. At step S9042, when w_c=0, three dummy elliptic curve doublings and one dummy elliptic curve addition are executed. Similarly, when w_c does not equal 0, three dummy elliptic curve doublings are executed at step S9046 and one dummy elliptic curve addition is executed at step S9047. Therefore, the same calculations are executed in the case of w_c=0 and in the case of w_c≠0. Furthermore, a dummy addition is executed at step S9047 when w_c=0, and therefore the same calculations are executed as in the case of w_c≠0.

Therefore, with the described method of countering simple power analysis, since the same calculations are performed in both the case of w_c=0 and the case of w_c≠0, the power waveforms are the same, an attacker will not be able to acquire information as to whether or not w_c=0.

Non-patent Document 1: Paul C. Kocher, "Timing attacks on implementations of Diffie-Hellman, RSA, DSS, and Other Systems", in Neal Koblitz, editor, CRYPTO'96, LNCS1109, Springer-Verlag,1996, pp. 104-113.

Non-patent Document 2: P. Kocher, J. Jaffe, and B. Jun, "Differential Power Analysis", Advances in Cryptology -CRYPTO '99, LNCS, 1666, Springer-Verlag, 1999, pp. 388-397.

Non-patent Document 3: R. Okamoto and H. Yamamoto, "Gendai Ango" ("Modern Cryptology"), Sangyo Tosho, 1997.

Non-patent Document 4: A. Miyaji, T. Ono and H. Cohen, "Efficient elliptic curve Exponentiation", ICICS'97, Springer-Verlag, 1999, pp. 282-291.

Non-patent Document 5: I. Blake, G. Seroussi and N. Smart, "Elliptic Curves in Cryptography", London Mathematical Society Lecture Note Series 265, CAMBRIDGE UNIVERSITY PRESS, 1999.

BRIEF SUMMARY OF THE INVENTION

Problem to be Solved by the Invention

With the described method of countering simple power analysis, three points other that P_1=P, namely P_2, P_3 and P_4, are stored in the table. However, there is a desire to reduce the size of the table for situations where resources are limited, such as for an IC card.

An object of the present invention is to provide an information security apparatus, an elliptic curve calculation apparatus, a method and a computer program that use a smaller table, while maintaining resistance against simple power analysis.

Means to Solve the Problem

In order to achieve the stated object, the present invention is an information security apparatus that processes information securely and reliably using an elliptic curve calculation, such that security of the elliptic curve calculation is based on a discrete logarithm problem on an elliptic curve E defined over a residue field Fp with a prime p being a modulus, and such that the elliptic curve calculation is for calculating a point k*C by multiplying a point C on the elliptic curve E with a coefficient k that is a positive integer less than the prime p, the information security apparatus including: a point storage unit operable to store the point C on the elliptic curve E; a digit storage unit operable to store a value of each digit position of the coefficient k; an acquisition unit operable to acquire a value w of one of the digit positions from the digit storage unit; multiplication units equal in number to the number of types of possible values expressed by the acquired digit; a selection unit operable to select one of the multiplication units that corresponds to the acquired value w; and a repeat control unit operable to control the acquisition unit, the selection unit and the multiplication units so as to repeatedly perform a procedure of selecting a value w from among the digit positions of the coefficient k, acquiring the one of the multiplication units that corresponds to the acquired value w, and multiplying in the selected multiplication unit, the procedure being repeated so as to be performed with respect to all digit positions of the coefficient k. Further, each of the multiplication units is operable to multiply the point C with the acquired value w, thereby obtaining a multiplication result, and add the multiplication result in a position corresponding to the digit position of the acquired value won the elliptic curve E, wherein, when a non-negative integer t exists that fulfills a condition that the acquired value w_can be divided by $2^t$ and cannot be divided by $2^{t+1}$, the multiplication unit performs calculations that include, on the elliptic curve E, adding a point obtained by multiplying a point Q with $w/2^t$ or subtracting a point obtained by multiplying a point Q with $|w/2^t|$.

Here, the point storage unit corresponds to an operand value storage unit 224 in the embodiments, the digit storage unit corresponds to a divisional information storage unit 223, the acquisition unit corresponds to an acquisition unit 241, the selection unit corresponds to a selection unit 242, the plurality of multiplication units corresponds respectively to window calculation units 251 to 258, and the repeat control unit corresponds to a repeat control unit 243. Furthermore, "window" in the preferred embodiments is referred to as "digit" here.

EFFECTS OF THE INVENTION

According to the stated structure, the multiplication unit corresponding to the value w performs, on the elliptic curve E, an addition of a point obtained by multiplying the point Q with $w/2^t$ or a subtraction of a point obtained by multiplying the point Q with $|w/2^t|$. Therefore, when the length of each digit is 3 bits, for instance, the only point other than C that is used in addition or subtraction is 3*C. Furthermore, when the length of each digit is 4 bits, for instance, the only points other than C that are used in addition or subtraction are 3*C., 5*C. and 7*C.

With a conventional technique, when the length of each digit is 3 bits for instance, the points other than C that are used in addition or subtraction are 2*C., 3*C., and 4*C., and when the length of each digit is 4 bits, the points other than C that are used in addition or subtraction are 2*C., 3*C., 4*C., 5° C., 6° C., 7° C., and 8° C.

In this way, compared to a conventional technique, the present invention uses fewer points in addition or subtraction, and uses a smaller table.

Here, the acquired digit may be sw bits in length, and when the non-negative integer t exists, the multiplication unit corresponding to the value w may perform calculations (sw+1) times, an (sw-t+1)th of the calculations being the addition or the subtraction on the elliptic curve E, and each other of the (sw+1) calculations being a doubling on the elliptic curve E.

According to the stated structure, the same calculation result that would be obtained with a conventional technique is obtained, with a reduced number of points used in addition or subtraction.

Here, the information security apparatus may further include a table generation unit operable to repeatedly perform a procedure of adding 2*Q to an addition point, a point Q being an initial addition point, to obtain a new addition point, thereby generating $2^{sw-1}$ addition points other than the point Q, wherein when the non-negative integer t exists, the multiplication unit corresponding to the value w uses the addition points generated by the table generation unit as points obtained by multiplying the point Q with $w/2^t$ or $|w/2^t|$.

According to the stated structure, $2^{t1}$ addition points are calculated by the table generation unit, and therefore the multiplication units perform fewer calculations.

Here, each digit may be 3 bits in length, when the value w is 2, the corresponding multiplication unit may perform doubling, doubling, addition, and doubling on the elliptic curve E in the stated order, the addition being a calculation for adding a point C, when the value w_is 4, the corresponding multiplication unit may perform doubling, addition, doubling, and doubling on the elliptic curve E in the stated order, the addition being a calculation for adding a point C, and when the value w_is −2, the corresponding multiplication unit may perform doubling, doubling, subtraction, and doubling on the elliptic curve E in the stated order, the subtraction being a calculation for subtracting a point C.

According to the stated structure, the only point other than C that is used in addition or subtraction is 3*C., and the size of the table used is smaller than with a conventional technique.

Here, each digit may be 4 bits in length, when the value w is 2, the corresponding multiplication unit may perform doubling, doubling, doubling, addition, and doubling on the elliptic curve E in the stated order, the addition being a calculation for adding a point C, when the value w_is 4, the corresponding multiplication unit may perform doubling, doubling, addition, doubling, and doubling on the elliptic curve E in the stated order, the addition being a calculation for adding a point C, when the value w_is 6, the corresponding multiplication unit may perform doubling, doubling, doubling, addition, and doubling on the elliptic curve E in the stated order, the addition being a calculation for adding a point 3*C., when the value w_is 8, the corresponding multiplication unit may perform doubling, addition, doubling, doubling, and doubling on the elliptic curve E in the stated order, the addition being a calculation for adding the point a point C, when the value w_is −6, the corresponding multiplication unit may perform doubling, doubling, doubling, subtraction, and doubling on the elliptic curve E in the stated order, the subtraction being a calculation for subtracting a point 3*C., when the value w_is −4, the corresponding multiplication unit may perform doubling, doubling, subtraction, doubling, and doubling on the elliptic curve E in the stated order, the subtraction being a calculation for subtracting a point C, and when the value w_is −2, the corresponding multiplication unit may perform doubling, doubling, doubling, subtraction, and doubling on the elliptic curve E in the stated order, the subtraction being a calculation for subtracting a point C.

According to the stated structure, the only points other than C that are used in addition or subtraction are 3*C., 5° C. and 7° C., and the size of the table used smaller than with a conventional technique.

Here, each of the addition or subtraction and the doublings may include a dummy calculation such that the addition or subtraction and the doublings may execute the same type of calculations in the same order.

According to the stated structure, addition or subtraction and doublings execute the same types of calculations in the same order as each other, and therefore even if an attempt is made to analyze calculations based on the power waveform, identical waveforms will be output for the addition or subtraction and the doublings, and it will be difficult to distinguish between the calculations. Therefore, the present invention is resistant to a power analysis attack.

Here, when the non-negative integer t exists and the acquired digit is a bits in length, the multiplication unit corresponding to the value w may perform calculations (a+1) times successively, an (a−t+1)th of the (a+1) calculations being the addition or the subtraction on the elliptic curve E, and each other of the (a+1) calculations being a doubling on the elliptic curve E, and when the non-negative integer exists and the acquired digit is b bits in length, the multiplication unit corresponding to the value w may perform calculations (b+1) times successively, a (b−t+1)th of the (b+1) calculations being the addition or the subtraction on the elliptic curve E, and each other of the (b+1) calculations being a doubling on the elliptic curve E.

According to the stated structure, calculations can be performed in a case in which different digits are expected to have different bit lengths.

Here, the information security apparatus may be an encryption apparatus that encrypts information using elliptic curve calculation that calculates a point k*C.

The stated structure resists a power analysis attack against encryption of information.

Here, the information security apparatus may be a decryption apparatus that decrypts encrypted information using elliptic curve calculation that calculates a point k*C.

The stated structure resists a power analysis attack against decryption of information.

Here, the information security apparatus may be a digital signature generation apparatus that subjects information to a digital signature using elliptic curve calculation that calculates a point k*C.

The stated structure resists a power analysis attack against generation of a digital signature.

Here, the information security apparatus may be a digital signature verification apparatus that performs verification of a digital signature using elliptic curve calculation that calculates a point k*C.

The stated structure resists a power analysis attack against verification of a digital signature.

Here, the information security apparatus may be a key sharing apparatus that generates a shared key with another key sharing apparatus, using elliptic curve calculation that calculates a point k*C.

The stated structure resists a power analysis attack against key sharing.

Furthermore, the present invention is an elliptic curve calculation apparatus that processes information securely and reliably using an elliptic curve calculation, such that security of the elliptic curve calculation is based on a discrete logarithm problem on an elliptic curve E defined over a residue field Flo with a prime p being a modulus, and such that the elliptic curve calculation is for calculating a point k*C by multiplying a point C on the elliptic curve E with a coefficient k that is a positive integer less than the prime p. Accordingly, the elliptic curve calculation apparatus includes: a point storage unit operable to store the point C on the elliptic curve E; a digit storage unit operable to store a value of each digit position of the coefficient k; an acquisition unit operable to acquire a value w of one of the digit positions from the digit storage unit; multiplication units equal in number to the number of types of possible values expressed by the acquired digit; a selection unit operable to select one of the multiplication units that corresponds to the acquired value w; and a repeat control unit operable to control the acquisition unit, the selection unit and the multiplication units so as to repeatedly perform a procedure of acquiring a value w from among the digit positions of the coefficient k, selecting the one of the multiplication units that corresponds to the acquired value w, and multiplying in the selected multiplication unit, the procedure being repeated so as to be performed with respect to all digit positions of the coefficient k. In addition, each of the multiplication units is operable to multiply the point C with the acquired value w, thereby obtaining a multiplication result, and add the multiplication result in a position corresponding to the digit position of the acquired value w on the elliptic curve E, wherein, when a non-negative integer t exists that fulfills a condition that the acquired value w_can be divided by $2^t$ and cannot be divided by $2^{t+1}$, the multiplication unit performs calculations that include, on the elliptic curve E, adding a point obtained by multiplying a point Q with $w/2^t$ or subtracting a point obtained by multiplying a point Q with $|w/2^t|$.

According to the stated structure, compared to a conventional technique, the present invention uses fewer points in addition or subtraction, and uses a smaller table.

As has been described, the information security apparatus and the elliptic curve calculation apparatus have a superior effect of using a smaller table than a conventional technique, while maintaining resistance against simple power analysis.

BRIEF DESCRIPTION OF THE DRAWINGS

FIG. 12 is a calculation conversion table 320 in the case of sw=3, for explaining the significance of the calculations at steps S161 to S168 of FIG. 11;

FIG. 17 shows a calculation conversion chart 330 in the case of sw=4; and

Figure 1:
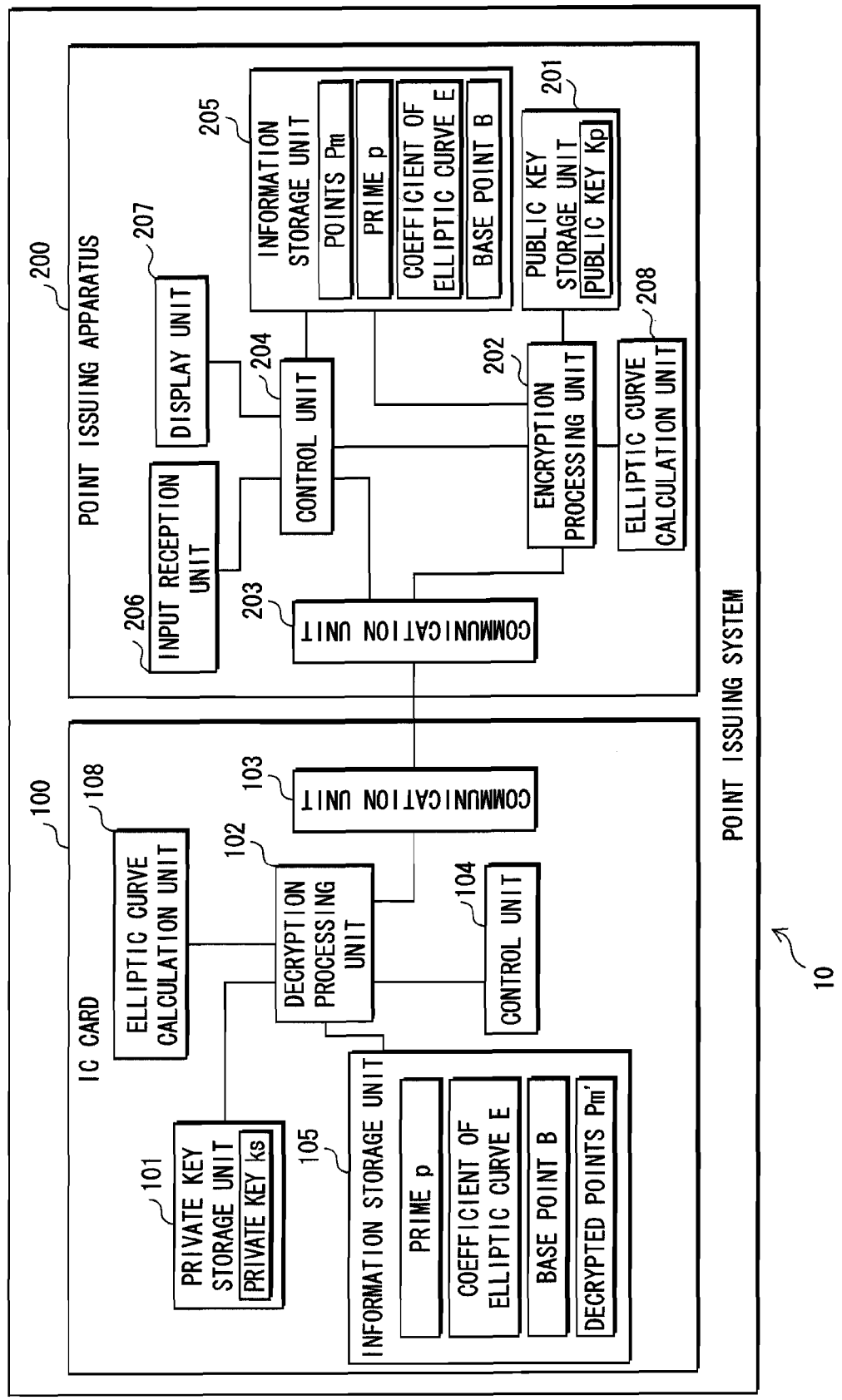
FIG. 1 is a system structural drawing showing the structure of a point issuing system 10 as a first embodiment of the present invention.

10 Point issuing system
100° C. card
101 Private key storage unit
102 Decryption processing unit
103 Communication unit
104 Control unit
105 Information storage unit
108 Elliptic curve calculation unit
200 Point issuing apparatus
201 Public key storage unit
202 Encryption processing unit
203 Communication unit
204 Control unit
205 Information storage unit
206 Input reception unit
207 Display unit
208 Elliptic curve calculation unit
221 Exponent coefficient storage unit
222 Divisional information generation unit
223 Divisional information storage unit 224 Operand value storage unit
225 Table generation unit
226 Elliptic curve adding unit
227 Elliptic curve doubling unit
228 Table storage unit
229 Scalar multiple calculation unit
230 Input unit
231 Output unit

DETAILED DESCRIPTION OF THE INVENTION

1. First Embodiment

A description is given of a point issuing system 10 as an embodiment of the present invention.

1.1 Structure of the point issuing system 10

The point issuing system 10, as shown in FIG. 1, is composed of an IC card 100 and a point issuing apparatus 200.

The IC card 100 is loaded into the point issuing apparatus 200 by an operator of the point issuing apparatus 200, the point issuing apparatus 200 generates points, subjects generated points to an encryption algorithm to generate encrypted-points, and transmits the generated encrypted points to the IC card 100.

Here, "points" denotes information representing a "reward" that, for instance, a user who purchases a product or is provided with a service received from the seller of the product or the provider of the service, and part or all of the points may be used as payment to the seller or service provider when the user next purchases a product or is provided with a service.

The IC card 100 receives the encrypted points, subjects the received encrypted points to a decryption algorithm corresponding to the encryption to generate decrypted points, and stores the generated decrypted points internally.

Each of the point issuing apparatus 200 and the IC card 100 is an information security apparatus that processes information securely using elliptic curve calculation that calculates a point k*C by multiplying a point C on an elliptic curve E with a coefficient k that is an integer less than a prime p, based on a discrete logarithmic problem on the elliptic curve E defined over a residue field F with the prime p being a modulus.

Here, processing information securely refers to processing information in a manner that when communicating the information between two parties, the information will not be known to a third party. This communication is also referred to as secret communication.

1.2 Public Key Encryption Scheme and Discrete Logarithm Problem

In the present embodiment, the encryption algorithm and decryption algorithm conform with a public key encryption scheme that uses calculation on an elliptic curve.

In secret communication that uses a public key encryption scheme, the encryption key and the decryption key are different, with the decryption key being secret and the encryption key being public.

A discrete logarithm problem defined on an elliptic curve is used as the grounds for security in this public key encryption scheme. Note that the discrete logarithm problem is described in detail in Neal Koblitz, "A course in Number Theory and Cryptography", Springer-Verlag, 1987.

The following describes the discrete logarithm problem on an elliptic curve.

The elliptic curve discrete logarithm problem is a problem as follows. (E(GF(p)) is the elliptic curve E defined over the finite field GF(p), with the element G that is included in the elliptic curve E being set as a base point when the order of the elliptic curve E is divisible by a large prime. This being so, the problem is to find an integer x that, with respect to a given element Y in the elliptic curve E, satisfies the relationship $$Y = x*G,$$

should such integer x actually exist.

Here, p is a prime, and GF(p) is a finite field having p elements. Furthermore, in the present Description, the symbol "*" represents a calculation for adding an element in the elliptic curve to itself a plurality of times, and x*G signifies adding an element G in the elliptic curve x times, as shown by the expression $$x*G = G + G + G + \ldots + G.$$

The reason a discrete logarithmic problem assists in the security of public key encryption is that the above calculation is extremely difficult to make with a large finite field GF(p).

1.3 Structure of Point Issuing Apparatus 200

The point issuing apparatus 200, as shown in FIG. 1, is composed of a public key storage unit 201, and encryption processing unit 202, a communication unit 203, a control unit 204, an information storage unit 205, input reception unit 206, a display unit 207, and an elliptic curve calculation unit 208.

Figure 2:
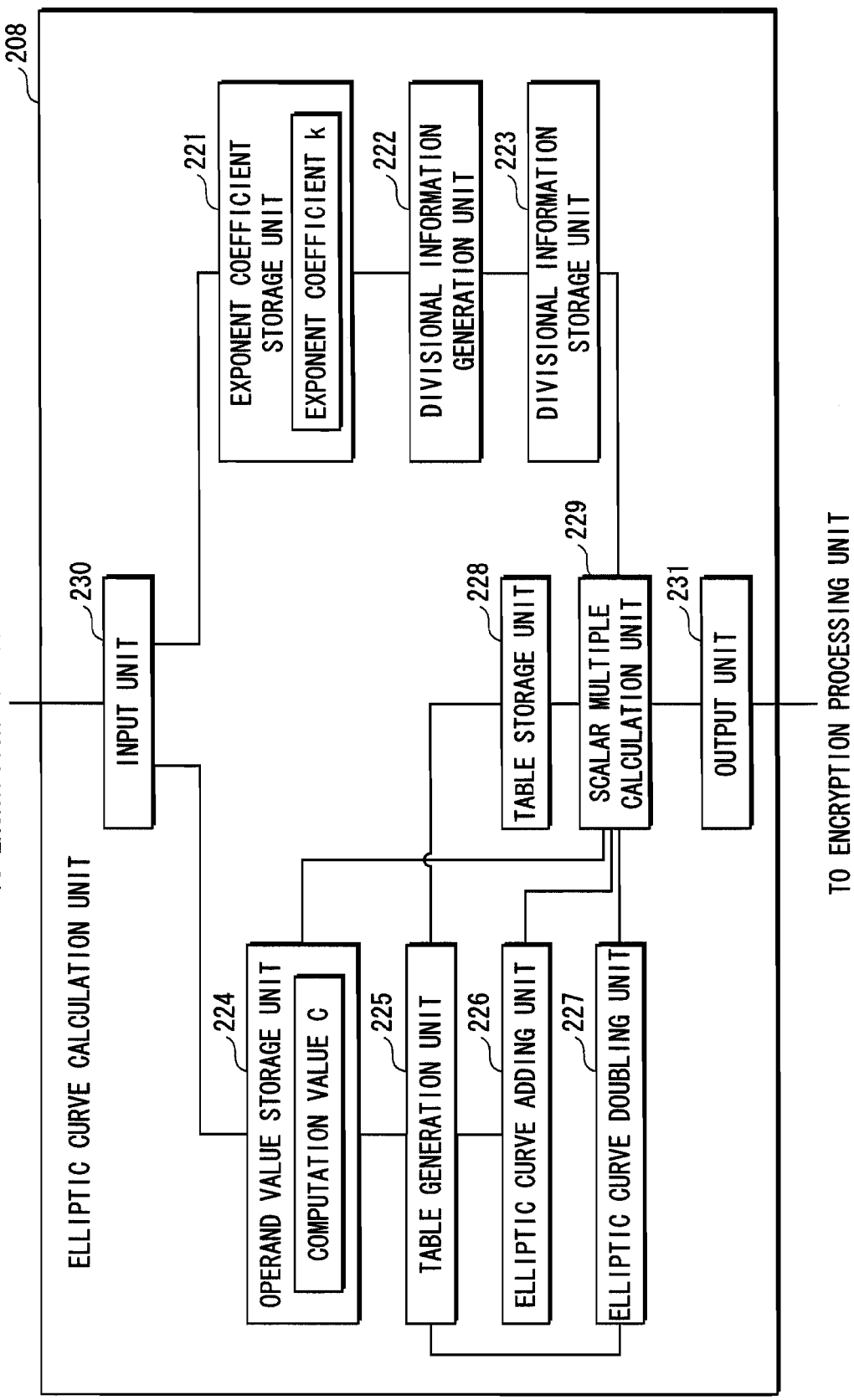
FIG. 2 is a block diagram showing the structure of an elliptic curve calculation unit 208.

Furthermore, the elliptic curve calculation unit 208, as shown in FIG. 2, is composed of an input unit 230, an exponent coefficient storage unit 221, a divisional information generation unit 222, a divisional information storage unit 223, an operand value storage unit 224, a table generation unit 225, an elliptic curve adding unit 226, an elliptic curve doubling unit 227, a table storage unit 228, a scalar multiplication unit 229, and an output unit 231.

The point issuing apparatus 200 generates points, encrypts the generated points, and writes the encrypted points to the IC card 100. The point issuing apparatus 200 is also a cash register apparatus that performs functions such as calculating the amount of a sale when a product is sold, displaying the amount, printing a receipt, storing the generated points internally, and safe-keeping cash paid by a user.

In concrete terms, the point issuing apparatus 200 is a computer system composed of a microprocessor, a ROM, a RAM, a hard disk unit, a display unit, a keyboard and the like. Computer programs are stored in the RAM or the hard disk unit, and the point issuing apparatus 200 achieves part of its functions by the microprocessor operating in accordance with the computer programs.

(1) Information Storage Unit 205 and Public Key Storage Unit 202

The information storage unit 205 stores a prime p, a base point B on an elliptic curve E(Fp) defined over a residue field Fp with the prime p being a modulus, and coefficients of the elliptic curve E (Fp). The information storage unit 205 also has an area for storing a generated points Pm.

As one example, the elliptic curve E(Fp) is $y^2=x^3+a \times x+b$, and the coefficients are a and b.

The public key storage unit 201 stores a public key Kp that corresponds to a secret key (private key) ks described below. The public key Kp is calculated by the IC card 100 or the key storage apparatus using the following expression.

Public key $Kp$=private key $ks$*base point B (2) Control Unit 204

The control unit 204 generates points Pmas the bonus information, and writes the generated points Pm to the information storage unit 205. The control unit 204 then outputs, to the encryption processing unit 202, an instruction that shows encrypting the points Pm and transmitting the encrypted points Pm to the IC card 100.

(3) Communication Unit 203, Input Reception Unit 206, and Display Unit 207

The communication unit 203 performs transmission and reception of information with the IC card 100, under the control of the encryption processing unit 202 or the control unit 204.

The input reception unit 206 receives input of information or an instruction from the operator of the point issuing apparatus 200, and outputs the information or instruction to the control unit 204.

The display unit 207 display various information according to control by the control unit 204.

(4) Encryption Processing Unit 202

The encryption processing unit 202 receives, from the control unit 204, an instruction that shows encrypting the points Pm and transmitting the encrypted points Pm to the IC card 100.

Upon receiving the instruction, the encryption processing unit 202 generates a random number r, and reads the base point B from the information storage unit 205. Next, the encryption processing unit 202 outputs the generated random number r as an exponent coefficient k to the input unit 230 of the elliptic curve calculation unit 208, and outputs the read base point B as a computation value C, to the input unit 230. Next, the encryption processing unit 202 receives an exponent k*C=r*B as a calculation result from the output unit 231 of the elliptic curve calculation unit 208, and sets first ciphertext s1=exponent r*B.

Next, the encryption processing unit 202 reads the public key Kp from the public key storage unit 201, outputs the generated random number r to the input unit 230 as an exponent coefficient k, and outputs the read public key Kp to the input unit 230 as a computation value C. Next, the encryption processing unit 202 receives an exponent k*C=Kp as a calculation result from the output unit 231.

Next, the encryption processing unit 202 reads the points Pm from the information storage unit 205, subjects the read points Pm and the x coordinate of the received exponent r*Kp to an exclusive OR to generate a second ciphertext s2=points Pm xor (x coordinate value of exponent r*Kp). Here, "xor" is an operator showing an exclusive OR.

The encryption processing unit 202 transmits the generated first ciphertext s1 and second ciphertext s2 via the communication unit 203 to the IC card 100.

(5) Elliptic Curve Calculation Unit 208

The elliptic curve calculation unit 208, as described above, is composed of an input unit 230, an exponent coefficient storage unit 221, a divisional information generation unit 222, a divisional information storage unit 223, an operand value storage unit 224, a table generation unit 225, an elliptic curve adding unit 226, an elliptic curve doubling unit 227, a table storage unit 228, a scalar multiplication unit 229, and an output unit 231.

(5-1) Exponent Coefficient Storage Unit 221 and Operand Value Storage Unit 224

The exponent coefficient storage unit 221 has an area for storing only one exponent coefficient k. The exponent coefficient k is scalar, and the number of bits thereof is len.

The operand value storage unit 224 also has an area for storing one computation value G. The computation value G is a point on the elliptic curve.

(5-2) Input Unit 230 and Output Unit 231

The input unit 230 receives the exponent coefficient k from the encryption processing unit 202, and if the exponent coefficient storage unit 221 already stores an exponent coefficient, overwrites the stored exponent coefficient with the received exponent coefficient k. If the exponent coefficient storage unit 221 does not already store an exponent coefficient, the input unit 230 writes the received exponent coefficient k to the exponent coefficient storage unit 221.

The input unit 230 also receives the computation value C from the encryption processing unit 202, and if the operand value storage unit 224 already stores a computation value, overwrites the stored computation value with the received computation value C. If the operand value storage unit 224 does not already store a computation value, the input unit 230 writes the received computation value C to the operand value storage unit 224.

The output unit 231 receives an exponent k*C from the scalar multiplication unit 229, and outputs the received exponent k*C to the encryption processing unit 202.

(5-3) Divisional Information Storage Unit 223

The divisional information storage unit 223 has an area for storing an integer string {w_i} composed of (b+1) integers w_i{i=1, 2, 3, . . . , b+1} described below.

(5-4) Divisional Information Generation Unit 222

The divisional information generation unit 222 reads the exponent coefficient k from the exponent coefficient storage unit 221, and as described below, generates an integer string {w_i} composed of integers w_i{i=1, 2, 3, . . . , b+1} that are divisional information from the read exponent coefficient k as follows.

Here, w_i is an sw-bit signed integer value, wherein sw is the width of a signed window method, and as one example, sw=3. In this case, the possible values of w_i are "−3", "−2", "−1", "0", "1", "2", "3" and "4". b is "(smallest integer equal to or greater than len/sw)−1", wherein len is the number of bits of a variable v described below. Furthermore, "×" is an operator showing multiplication of integers, and "x^y" is a calculation showing x raised to the y-th power.

For example, if len=52, b=18−1=17. Note that although sw=3 in the following example, sw may be "2" or may be "4" or greater.

Figure 3:
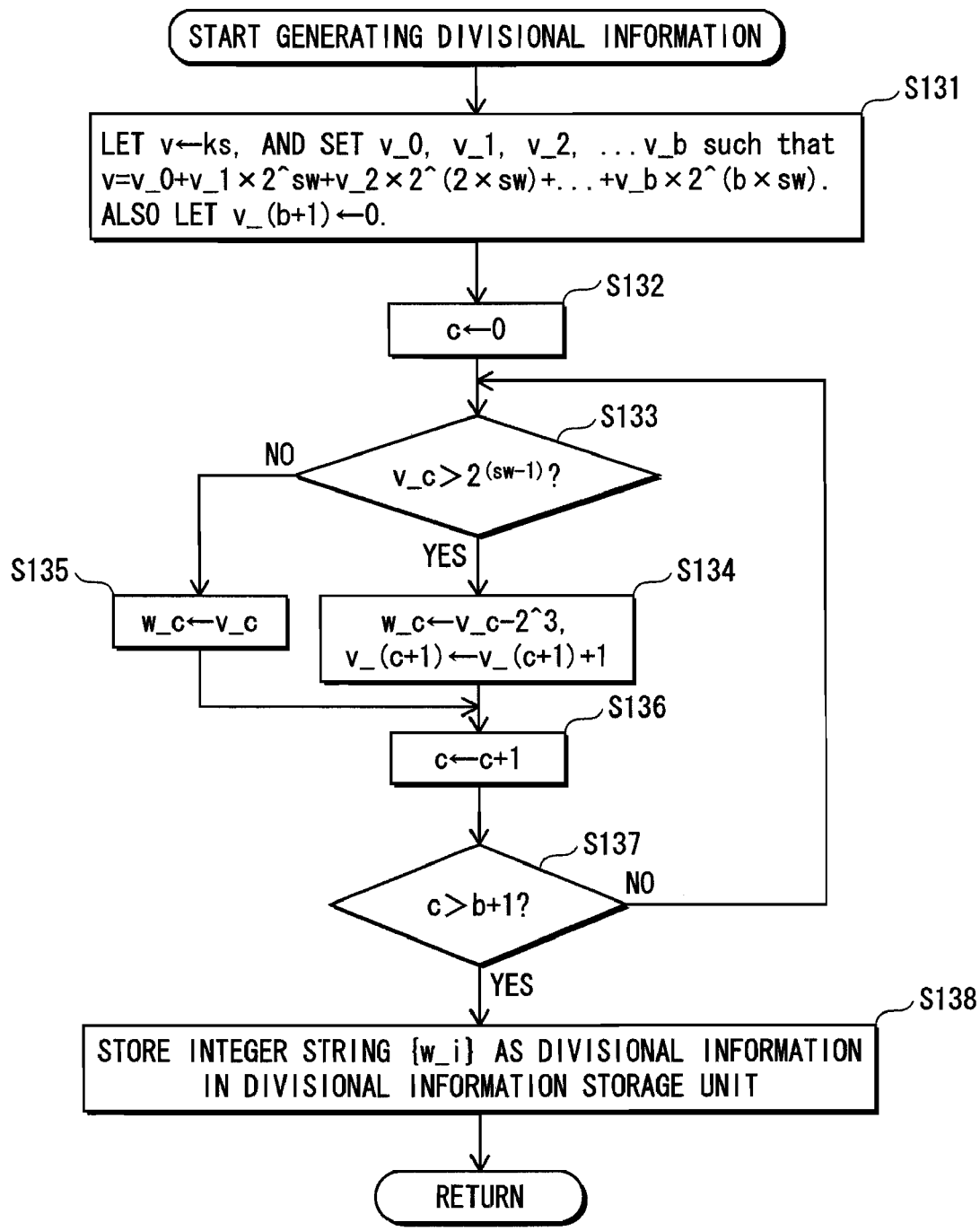
FIG. 3 is a flowchart showing operations of a divisional information generation unit 222.

The following describes operations by the divisional information generation unit 222 with use of the flowchart shown in FIG. 3.

The divisional information generation unit 222 assigns the exponent coefficient k to the variable v (v←ks), and sets $v\_0$, $v\_1, v\_2, \ldots v\_b$ such that $v=v\_0+v\_1\times2\hat{\ }sw+v\_2\times2\hat{\ }(2\times sw)+\ldots+v\_b\times2\hat{\ }(b\times sw)$. The divisional information generation unit 222 also lets $v\_(b+1)\leftarrow 0$ (step S131). Here, $v\_i$ (i=0, 1, 2, ..., b) is sw bits.

Next, the divisional information generation unit 222 assigns 0 to a counter variable c (c←0) (step S132).

Next, the divisional information generation unit 222 judges whether $v\_c>2\hat{\ }(sw-1)$, and when $v\_c>2\hat{\ }(sw-1)$ (YES at step S133), calculates $w\_c\leftarrow v\_c-2\hat{\ }3$ and $v\_(c+1)\leftarrow v\_(c+1)+1$ (step S134). When $v\_c\leqq 2\hat{\ }(sw-1)$ (NO at step S133), the divisional information generation unit 222 assigns $v\_c$ to $w\_c$ ($w\_c\leftarrow v\_c$) (step S135).

Next, the divisional information generation unit 222 calculates c←c+1 (step S136).

Next, the divisional information generation unit 222 judges whether or not c>b+1, and when c>b+1 (YES at step S137), stores the integer string $\{w\_i\}$ in the divisional information storage unit 223 as divisional information (step S138), and ends the processing for generating divisional information. When c≦b+1 (NO at step S137), the processing returns to step S133 and is repeated.

(5-5) Elliptic Curve Adding Unit 226 and Elliptic Curve Doubling Unit 227

The elliptic curve adding unit 226 receives, from the table generation unit 225 or the scalar multiplication unit 229, two points on an elliptic curve, namely P1=(X1, Y1, Z1) and P2=(X2, Y2, Z2), and a instruction to add these two points. With respect to the received P1=(X1, Y1, Z1) and P2=(X2, Y2, Z2), the elliptic curve adding unit 226 adds P1 and P2 on the elliptic curve as follows, to calculate a point P3=P1+P2=(X3, Y3, Z3), and outputs the calculated point P3 to the table generation unit 225 or scalar multiple calculation unit 229.

The elliptic curve doubling unit 227 receives, from the table generation unit 225 or the scalar multiplication unit 229, a point P1=(X1, Y1, Z1) on the elliptic curve, and an instruction to double the point P1. With respect to the received point P1=(X1, Y1, Z1), the elliptic curve doubling unit 227 subjects the point P1 to doubling calculation on the elliptic curve to generate a point P4=2*P1=(X4, Y4, Z4) that is double the point P1, and then outputs the calculated point P4 to the table generation unit 225 or the scalar multiplication unit 229.

Details of Adding by the Elliptic Curve Adding Unit 226 and Doubling By the Elliptic Curve Doubling Unit 227

In the present embodiment, dummy calculations are incorporated such that the calculations used in the elliptic curve adding unit 226 and the elliptic curve doubling unit 227, and the order thereof, are the same.

In the following, to clearly show that a dummy calculation is a dummy calculation, a variable D is used to denote where the result of the dummy calculation is to be assigned. Note that the elliptic curve addition and elliptic curve doubling used in the present embodiment are performed with respect to Jacobian coordinates. Non-Patent Document 4 gives details of Jacobian coordinates.

Before describing details of calculations by the elliptic curve adding unit 226 and the elliptic curve doubling unit 227, the calculation functions used are defined.

Sqr(X): shows squaring X.

Mul(X,Y): shows multiplying X and Y. Note that when the notation Mul(X,Y) is used even when X=Y, a multiplication of the same X is performed rather than squaring using Sqr(X).

Mul2(X): shows multiplying X and 2.

Mul3(X): shows multiplying X and 3.

Mul4(X): shows multiplying X and 4.

Mul8(X): shows multiplying X and 8.

Sub(X, Y): shows subtracting Y from X.

Operations by the Elliptic Curve Adding Unit 226 for Adding

Figure 4:
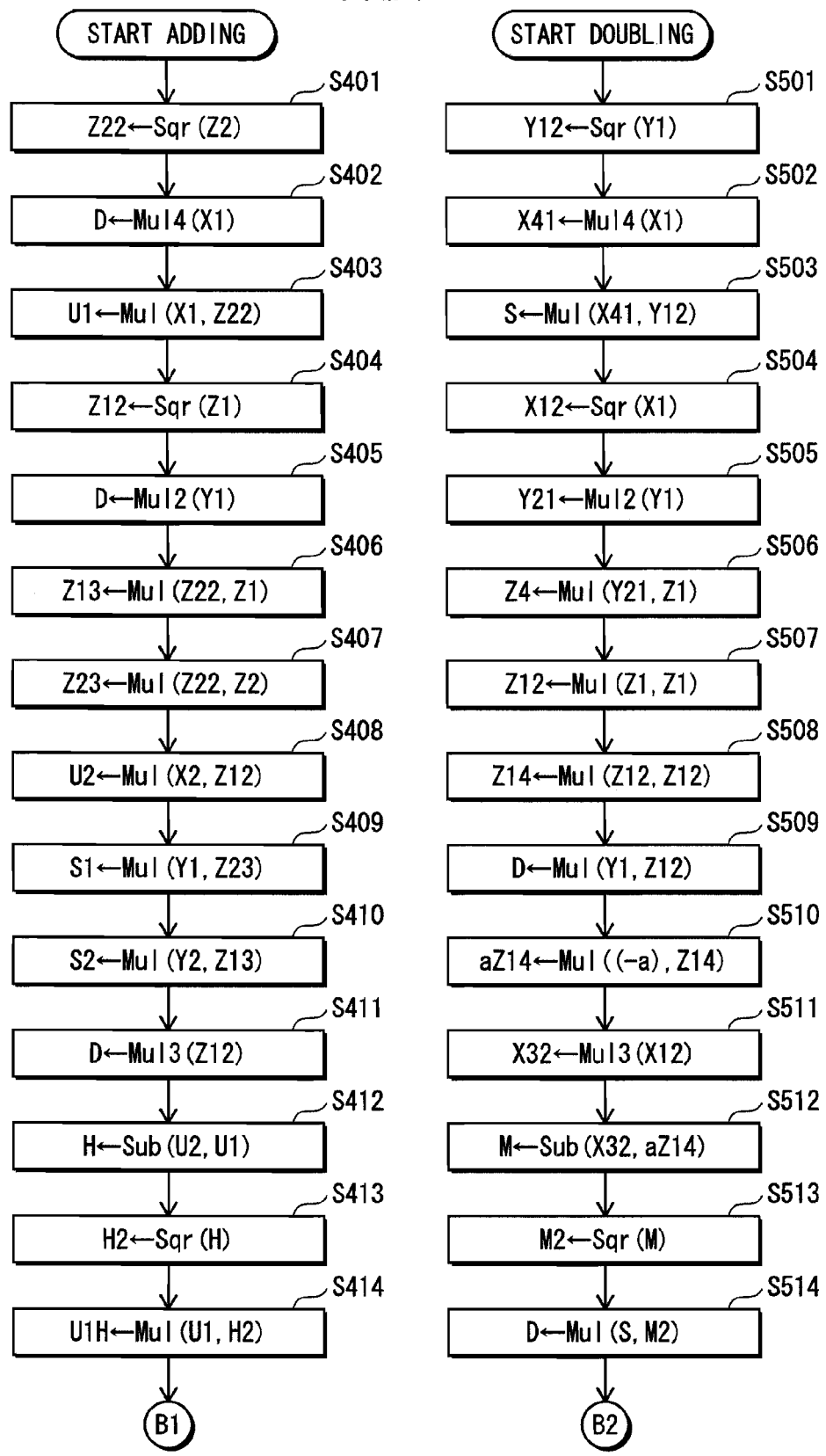
FIG. 4 is a flowchart showing operations for adding by an elliptic curve adding unit 226 and operations for doubling by an elliptic curve doubling unit 227, and is continued in FIG. 5.
Figure 5:
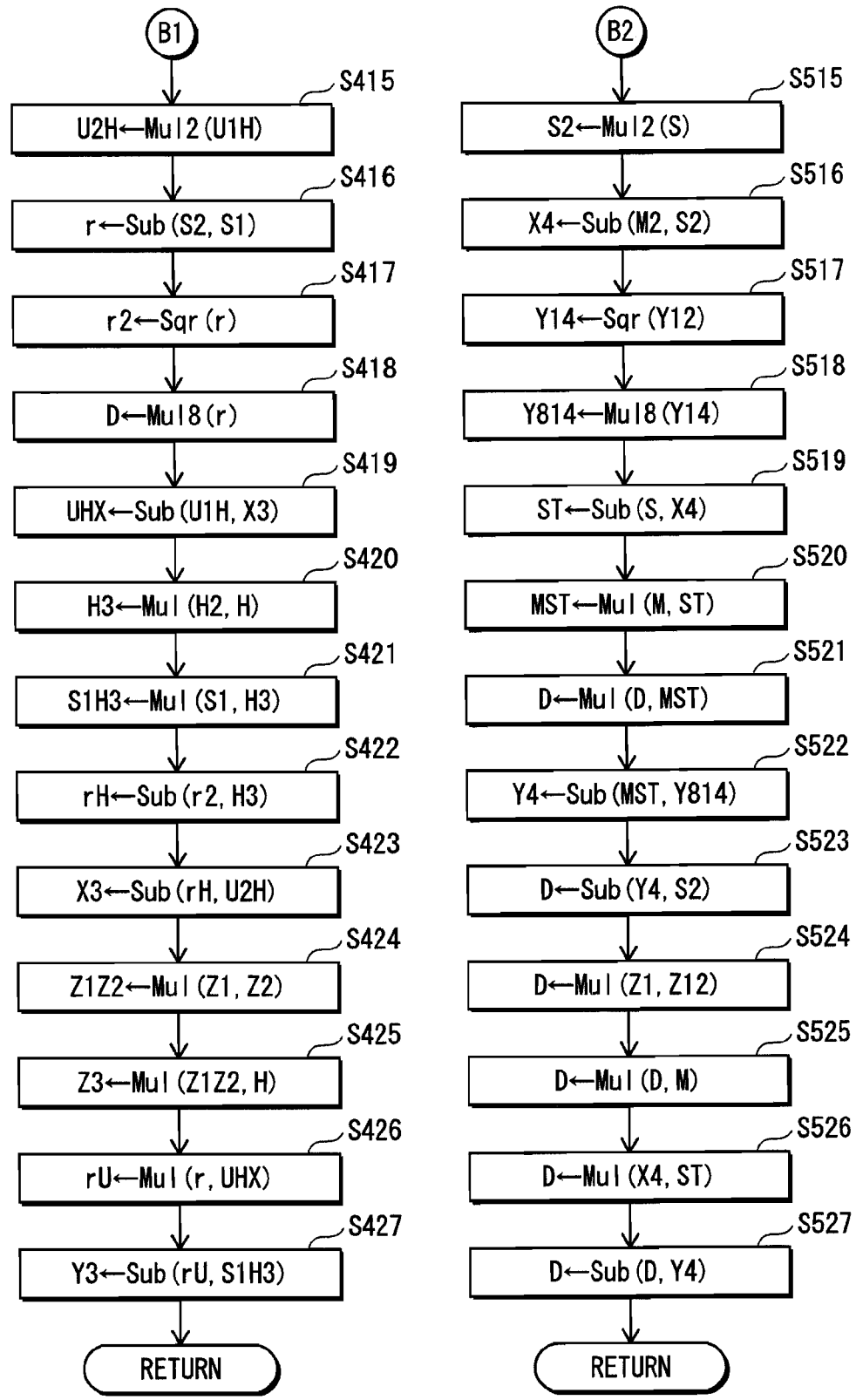
FIG. 5 is a flowchart showing operations for adding by the elliptic curve adding unit 226 and operations for doubling by the elliptic curve doubling unit 227, and is a continuation of FIG. 4.

The following describes operations by the elliptic curve adding unit 226 for adding, with use of the flowcharts shown in FIG. 4 and FIG. 5.

The elliptic curve adding unit 226 performs adding according to the following steps.

Z22←Sqr(Z2) (step S401),
DMul4(X1) (step S402),
U1←Mul(X1,Z22) (step S403),
Z12←Sqr(Z1) (step S404),
D←Mul2(Y1) (step S405),
Z13←Mul(Z22,Z1) (step S406),
Z23←Mul(Z22,Z2) (step S407),
U2←Mul(A2,Z12) (step S408),
S1←Mul(Y1,Z23) (step S409),
S2←Mul(Y2,Z13) (step S410),
D←Mul3(Z12) (step S411),
H←Sub(U2,U1) (step S412),
H2←Sqr(h) (step S413),
U1H←Mul(U1,H2) (step S414),
U2H←Mul2(U1H) (step S415),
r←Sub(S2,S1) (step S416),
r2←Sqr(r) (step S417),
D←Mul8(r) (step S418),
UHX←Sub(U1H,X3) (step S419),
H3←Mul(H2, H) (step S420),
S1H3←Mul(S1, H3) (step S421),
rH←Sub(r2, H3) (step S422),
X3←Sub(rH, U2H) (step S423),
Z1Z2←Mul(Z1, Z2) (step S424),
Z3←Mul(Z1Z2, H) (step S425),
rU←Mul(r, UHX) (step S426), and
Y3←Sub(rU, S1H3) (step S427).

Operations by the Elliptic Curve Doubling Unit 227 for Doubling

The following describes operations by the elliptic curve doubling unit 227 for doubling, with use of the flowcharts shown in FIG. 4 and FIG. 5.

The elliptic curve adding unit 226 performs doubling in accordance with the following steps.

Y12←Sqr(Y1) (step S501),
X41←Mul4(X1) (step S502),
S←Mul(X41, Y12) (step S503),
X12←Sqr(X1) (step S504),
Y21←Mul2(Y1) (step S505),
Z4←Mul(Y21, Z1) (step S506),
Z12←Mul(Z1, Z1) (step S507),
Z14←Mul(Z12, Z12) (step S508),
D←Mul(Y1, Z12) (step S509),
aZ14←mul((−a),Z14) (step S510),
X32←Mul3(X12) (step S511),
M←Sub(X32, aZ14) (step S512), M2←Sqr(M) (step S513),
D←Mul (S, M2) (step S514),
S2←Mul2(S) (step S515),
X4←Sub(M2, S2) (step S516),
Y14←Sqr(Y12) (step S517),
Y814←Mul8 (Y14) (step S518),
ST←Sub (S, X4) (step S519),
MST←Mul(M, ST) (step S520),
D←Mul (D, MST) (step S521),
Y4←Sub (MST, Y814) (step S522),
D←Sub (Y4, S2) (step S523),
D←Mul (Z1, Z12) (step S524),
D←Mul (D, M) (step S525),
D←Mul (X4, ST) (step S526), and
D←Sub (D, Y4) (step S527).

Note that (−a) that appears at step S510 is the negative value of a parameter a when the elliptic curve Equation is $y^2 = x^3 + a \times x + b$.

As can be seen from FIG. 4 and FIG. 5, the elliptic curve adding unit 226 and the elliptic curve doubling unit 227 execute the same calculations in the same order.

(5-6) Table Storage Unit 228

The table storage unit 228 has an area for storing one or more points on the elliptic curve generated by the table generation unit 225.

(5-7) Table Generation Unit 225

The table generation unit 225 generates a table {P_i} composed of points on the elliptic curve as described below, and stores the generated table {P_i} to the table storage unit 228.

Here, the table {P_i} includes one or more points P_i (i=1, 2, 3, . . . ) on an elliptic curve.

Figure 6:
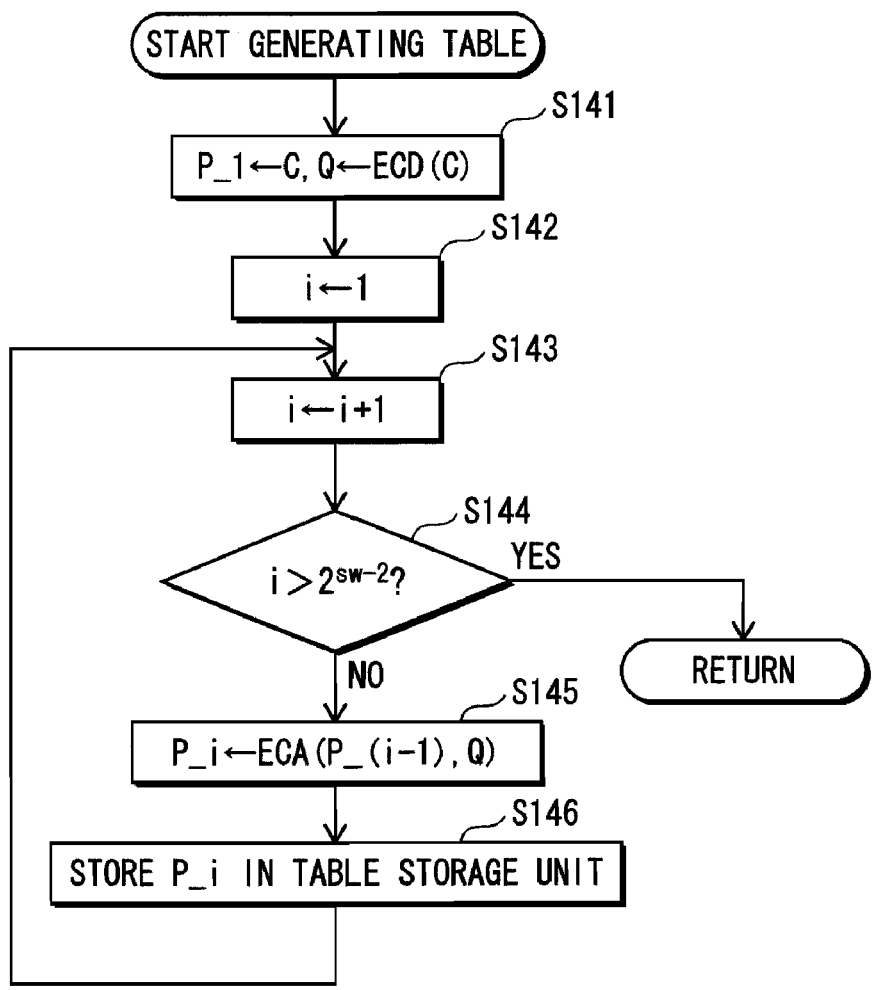
FIG. 6 is a flowchart showing operations by a table generation unit 225 for generating a table {P_i}.

The following describes operations by the table generation unit 225 for generating the table {P_i}, with use of the flowchart in FIG. 6.

The table generation unit 225 reads the computation value C from the operand value storage unit 224, and calculates P_1←C and Q←ECD (C) (step S141).

Here, ECD shows doubling on an elliptic curve, and calculating using the elliptic curve doubling unit 227. For example, ECD (A) shows a doubling calculation result calculated with respect to point A on an elliptic curve, and ECD (A)=2*A. The table generation unit 225 outputs a point C on an elliptic curve and a doubling instruction to the elliptic curve doubling unit 227, and receives a doubling calculation result from the elliptic curve doubling unit 227.

Next, the table generation unit 225 calculates L−1 using the counter variable i (step S142).

Next, the table generation unit 225 calculates i←i+1 (step S143), calculates $2^{sw-2}$, and judges whether or not $i > 2^{sw-2}$. When $i > 2^{sw-2}$ (step S144), the table generation processing ends.

When $i > 2^{sw-2}$ is not true (step S144), the table generation unit 225 calculates P_i←ECA (P_(i−1), Q). In other words, the table generation unit 225 calculates ECA (P_(i−1), Q)=P_(i−1)+Q (step S145).

Here, ECA shows adding on an elliptic curve, and shows calculating using the elliptic curve adding unit 226. For example, ECA (A, B) shows an addition result calculated with respect to point A and point B on an elliptic curve, where ECD (A)=A+B. The table generation unit 225 outputs point A and point B on an elliptic curve, and an adding instruction to the elliptic curve adding unit 226, and receives an addition result from the elliptic curve adding unit 226.

Next, the table generation unit 225 stores P_i in the table storage unit 228 (step S146), returns to step S143, and repeats the processing.

It can be seen that as a result of the described processing, P_i=(2×i−1)*C.

Figure 7:
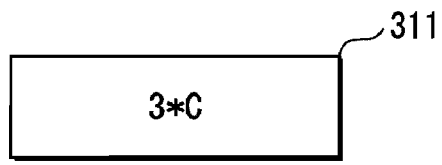
FIG. 7 shows an example of the table {P_i} generated by the table generation unit 225 when sw=3.
Figure 8:
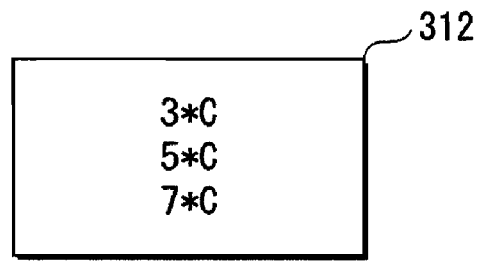
FIG. 8 shows an example of the table {P_i} generated by the table generation unit 225 when sw=4.
Figure 9:
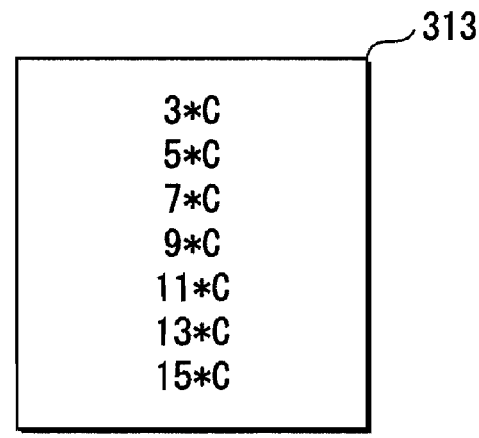
FIG. 9 shows an example of the table fP generated by the table generation unit 225 when sw=5.

FIG. 7, FIG. 8 and FIG. 9 show examples of the table {P_i} generated by the table generation unit 225 in respective cases of sw=3, 4 and 5.

As shown in FIG. 7, when sw=3, table 311 {P_i}={3C}. As shown in FIG. 8, when sw=4, table 312 {P_i 1}={3C, 5C, 7C}. As shown in FIG. 9, when sw=5, table 313 {P_i}={3C, 5C, 7C, 9C, 11C, 13C, 15C}.

(5-8) Scalar Multiplication Unit 229

The scalar multiplication unit 229 calculates a point k*C with respect to the exponent coefficient k, as described below using the integer string {w_i} stored in the divisional information storage unit 223 and the table {P_i} stored in the table storage unit 228.

Figure 18:
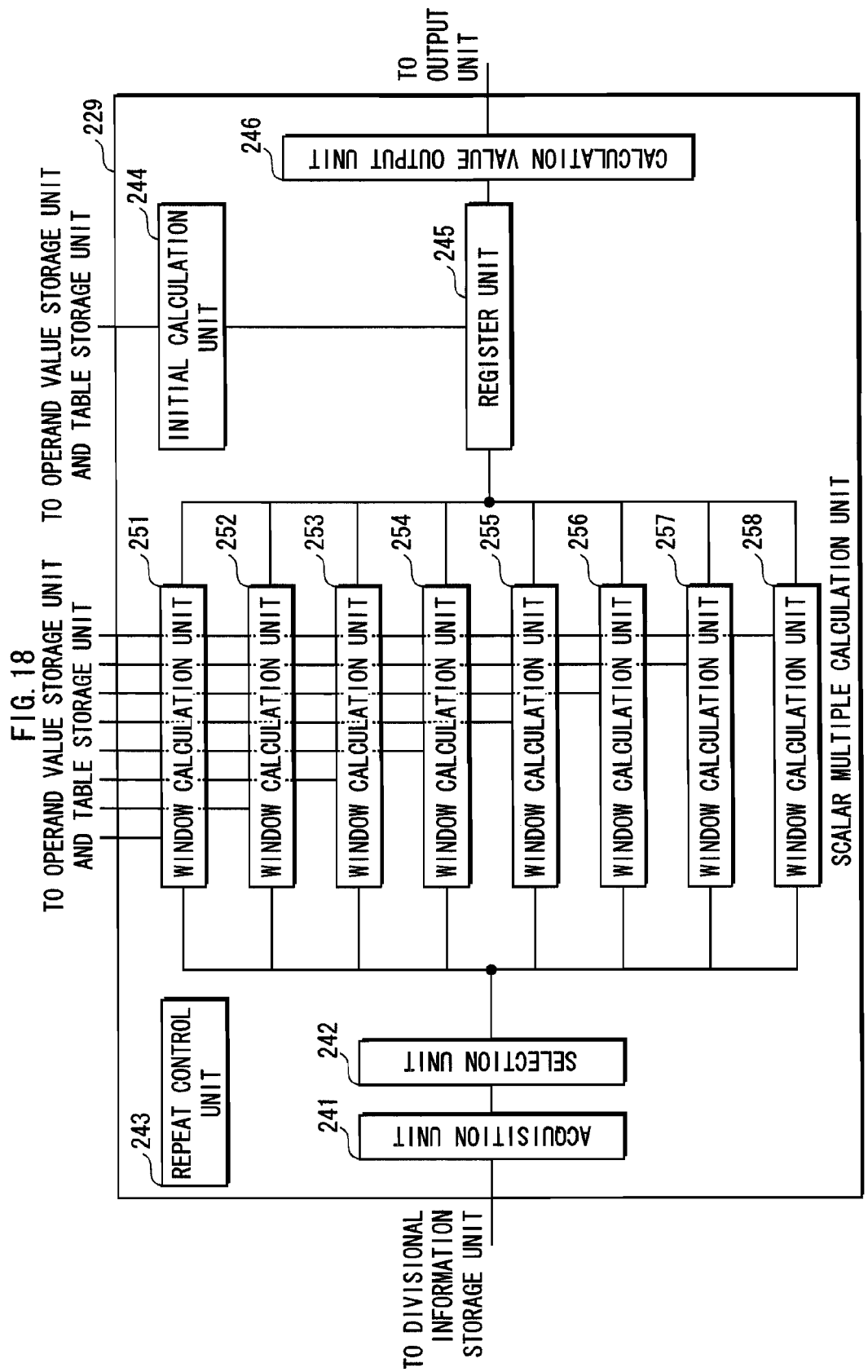
FIG. 18 is a block diagram showing the structure of a scalar multiple calculation unit 229.

As shown in FIG. 18, the scalar multiplication unit 229 is composed of an acquisition unit 241, a selection unit 242, a repeat control unit 243, window calculation units 251, 252, 253, 254, 255, 256, 257 and 258, an initial calculation unit 244, a register unit 245, and a calculation value output unit 246.

Figure 10:
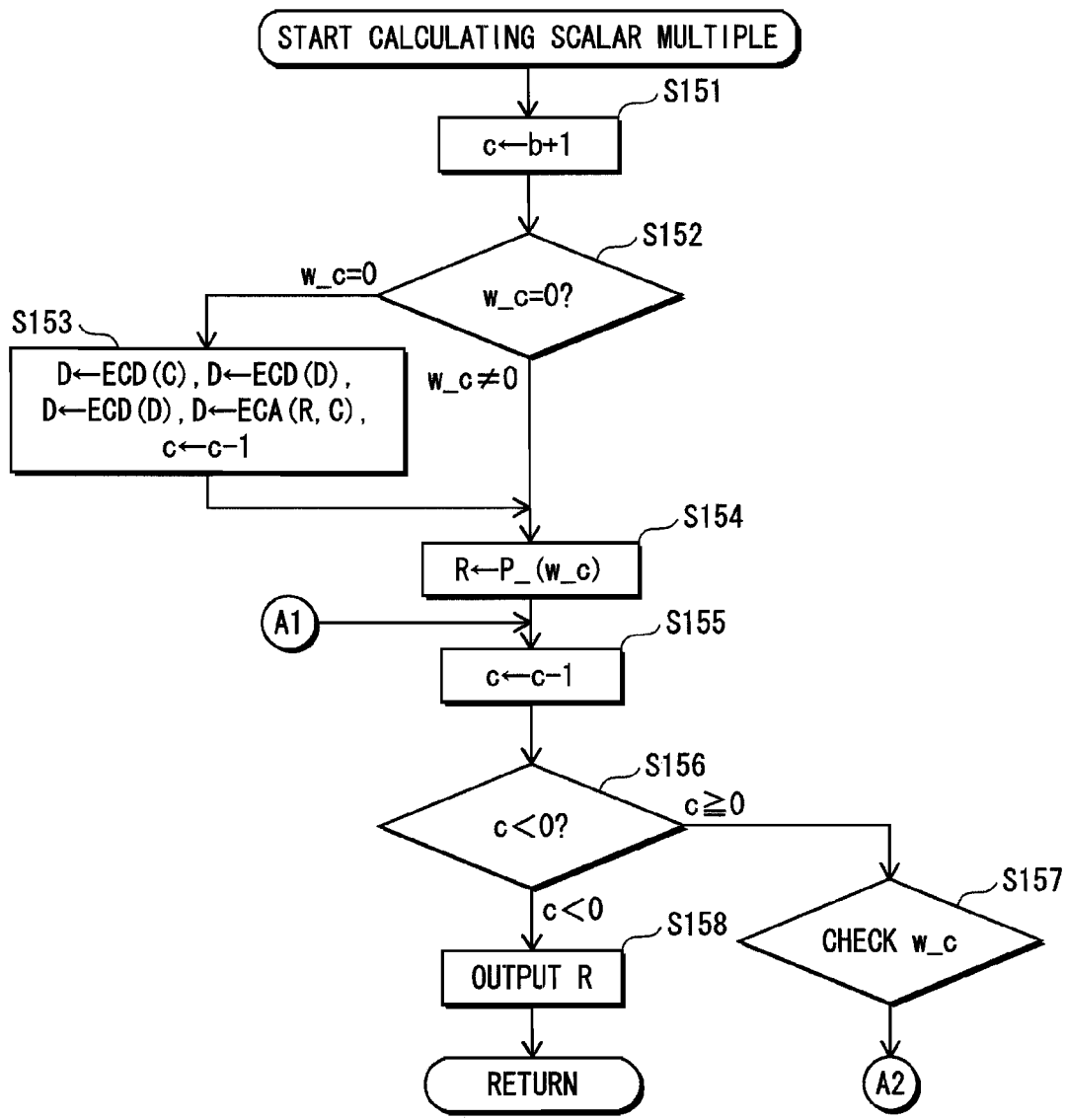
FIG. 10 is a flowchart showing a procedure for calculation by the scalar multiple calculation unit 229, and is continued in FIG. 11.
Figure 11:
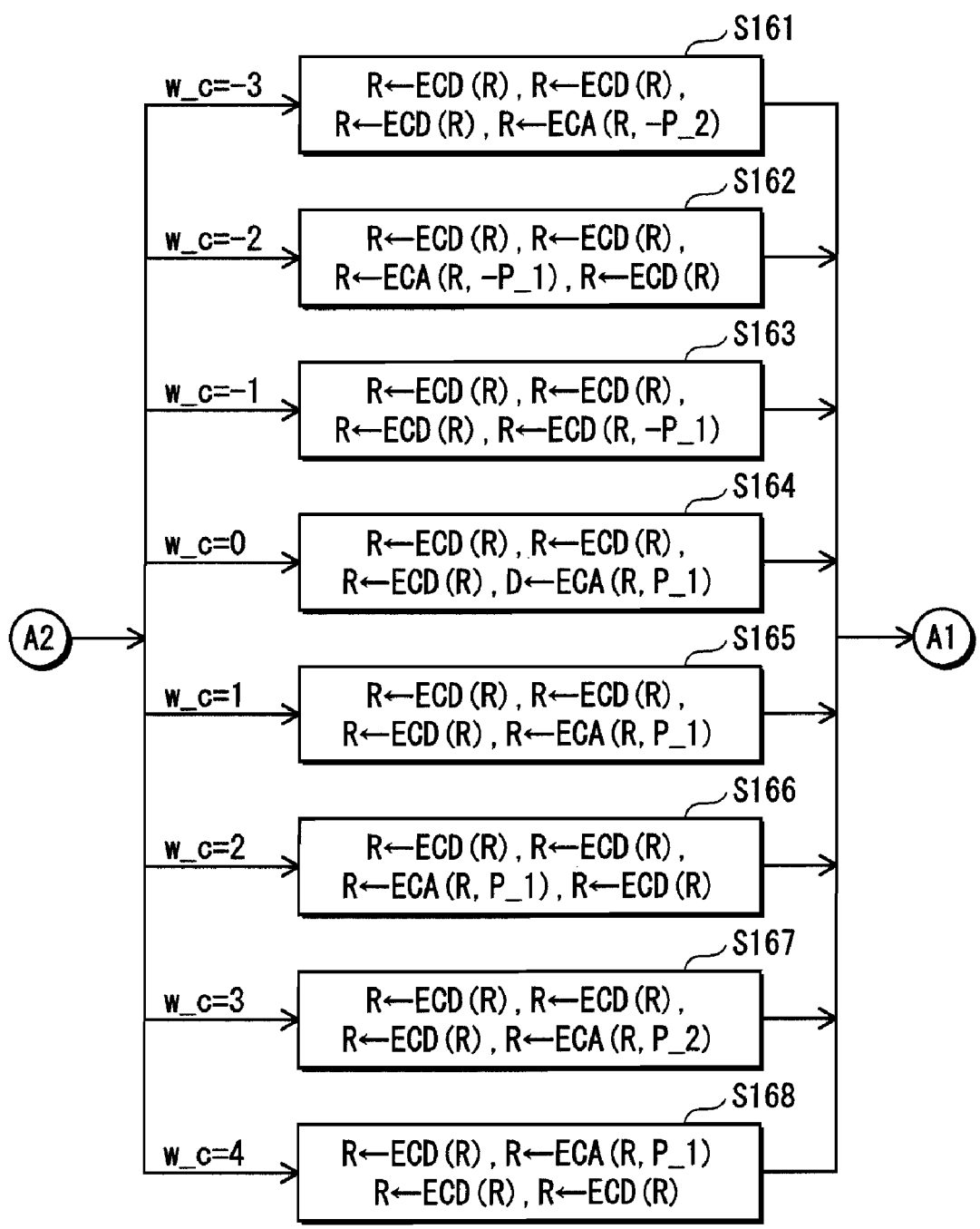
FIG. 11 is a flowchart showing a procedure for calculation by the scalar multiple calculation unit 229, and is continued from FIG. 11.

The procedure for calculation by the scalar multiplication unit 229 is described using the flowchart shown in FIG. 10 and FIG. 11.

Note that in the following, ECA is addition by the elliptic curve adding unit 226. When adding, the scalar multiplication unit 229 outputs two points on an elliptic curve and an adding instruction to the elliptic curve adding unit 226, and receives an addition result from the elliptic curve adding unit 226. Furthermore, ECD is doubling by the elliptic curve doubling 227. When doubling, the scalar multiple calculation unit 229 outputs one point on an elliptic curve and a doubling instruction to the elliptic curve doubling unit 227, and receives a doubling calculation result from the elliptic curve doubling unit 227.

Furthermore, in the following an example of the width of the window being 3 bits, in other words sw=3, is used.

The initial calculation unit 244 of the scalar multiplication unit 229 calculates c←b+1 (step S151). Here, c is a counter variable that counts how many times processing is performed, and is composed by a register in the register unit 245. As described above, b is "(smallest integer equal to or greater than len/sw)−1". The register unit 245 also has two registers that compose a variable D and a variable R described below.

Next, the initial calculation unit 244 of the scalar multiplication unit 229 judges whether or not w_c=0. When w_c=0 (step S152), the initial calculation unit 244 calculates D←ECD(C), D←ECD(D), D←ECD(D), D←ECA(R, C), and c←c−1 (step S153).

Next, the acquisition unit 241 acquires the P_(w_c), the initial calculation unit 244 of the scalar multiplication unit 229 calculates R←P_(w_c) (step S154), and the repeat control unit 243 calculates c←c−1 (step S155).

Next, the repeat control unit 243 of the scalar multiplication unit 229 judges whether or not c<0, and when c<0 (step S156), the calculation value output unit 246 outputs R to the output unit 231 (step S158), and the calculation processing ends.

When c≦0 (step S156), the acquisition unit 241 acquires P_(w_c), and the selection unit 242 of the scalar multiplication unit 229 performs the following processing according to the value of w_c (step s157).

When w_c=−3 (step S157), the selection unit 242 selects the window calculation unit 251, and the window calculation unit 251 calculates R←ECD(R) R←ECD(R), R←ECD(R), R←ECA(R, −P_2) (step S161).

When w_c=−2(step S157), the selection unit 242 selects the window calculation unit 252, and the window calculation unit 252 calculates R←ECD(R) R←ECD(R), R←ECA (R, −P_1), R←ECD(R) (step S162).

When w_c=−1 (step S157), the selection unit 242 selects the window calculation unit 253, and the window calculation unit 253 calculates R←ECD (R) R←ECD(R),R←ECD(R), R←ECD(R, −P_1) (step S163). When w_c=0 (step S157), the selection unit 242 selects the window calculation unit 254, and the window calculation unit 254 calculates R←ECD(R), R←ECD(R), R←ECD(R), R.-ECA (R, P_1) (step S164).

When w_c=1 (step S157), the selection unit 242 selects the window calculation unit 255, and the window calculation unit 255 calculates R←ECD(R), R←ECD(R), R←ECD(R), R.-ECA (R, P1) (step S165).

When w_c=2(step S157), the selection unit 242 selects the window calculation unit 256, and the window calculation unit 256 calculates R←ECD(R), R←ECD(R), R←ECA (R, P_1), RECD (R) (step S166).

When w_c=3 (step S157), the selection unit 242 selects the window calculation unit 257, and the window calculation unit 257 calculates R←ECD(R), R←ECD(R), R←ECD(R), R-ECA(R, P_2) (step S167).

When w_c=4 (step S157), the selection unit 242 selects the window calculation unit 258, and the window calculation unit 258 calculates R←ECD(R), R←ECA(R, P_1), R←ECD(R), RECD (R) (step S168).

The processing returns to step S155 and is repeated.

Calculations at Steps S161 to S168

Here, a description is given of the significance of each calculation at steps S161 to 5168 of FIG. 11, with use of a calculation conversion table 320 shown in FIG. 12.

Here, the plurality of calculations performed in accordance with the value of w_c are referred to as a window calculation for convenience.

For instance, R←ECD(R), R←ECD(R), R←ECD(R), D-ECA(R, P_1) performed at step S164 are one window calculation, and R←ECD(R), R←ECD(R), R←ECD(R), R-ECA(R, P1) performed at step S165 are one window calculation.

Furthermore, each ECA and ECD included in window calculations is called a basic calculation.

Here an example of the widow width being 3 bits, in other words sw=3, is used. For each possible value of w_c, the calculation conversion table 320 shows the relationship between: the value of w_c; a corresponding conventional window calculation; a corresponding window calculation by the scalar multiplication unit 229 (window calculation pertaining to the present invention); a basic calculation order showing the order that the basic calculations included in the window calculation are performed by the scalar multiplication unit 229; and a basic calculation times showing how many basic calculations are included in the window calculation.

Since the window width is 3 bits in the present example, the possible values of w_c are the following eight values: 0; 1; 2; 3; 4; −3; −2; and −1.

Next, a description is given of the conventional window calculation, the window calculation by the scalar multiplication unit 229, basic calculation order, and the basic calculation times in the case of each value of w_c.

(a) When w_c=0

The conventional window calculation for w_c=0 is R←$2^3$R. R←$2^3$R shows shifting the value of a variable R upwards by the number of bits shown by the window width (here, 3 bits).

The window calculation by the scalar multiplication unit 229 for w_c=0 is R←$2^3$R and D←R+C. R←$2^3$R is as described above. D←R+C is a dummy addition that is for adjusting the types and number of basic calculations in the window calculation in the case of w_c=0 so as to be the same as the types and number of basic calculations in the window basic calculation in other cases (i.e., in cases in which w_c≠0).

Here, R←$2^3$R is calculated by the scalar multiplication unit 229 by calculating R←2×R, R←2×R, R←2×R.

This is based on the fact that $2^3$R=2×(2×(2×R)).

Therefore, in the window calculation by the scalar multiplication unit 229 for w_c=0, a plurality of basic calculations are performed in the following order: doubling; doubling; doubling; and dummy addition.

In this way, the number of times that basic calculations are included in the window calculation performed by the scalar multiplication unit 229 for w_c=0 is "4".

(b) When w_c=1

The conventional window calculation for w_c=1 is R←$2^3$R+C. R←$2^3$R+C shows shifting the value of a variable R upwards by the number of bits shown by the window width (here, 3 bits), and then adding C to the variable R.

The window calculation by the scalar multiplication unit 229 for w_c=1 is R←$2^3$R+C.

As such, the conventional window calculation for w_c=1 and the window calculation by the scalar multiplication unit 229 are the same.

Here, R←$2^3$R+C is calculated by the scalar multiplication unit 229 by calculating R←2×R, R←2×R, R←2×R, R←R+C (see step S165).

Therefore, in the window calculation by the scalar multiplication unit 229 for w_c=1, a plurality of basic calculations are performed in the following order: doubling; doubling; doubling; and addition.

In this way, the number of times that basic calculations are included in the window calculation performed by the scalar multiplication unit 229 for w_c=1 is "4".

(c) When w_c=2

The conventional window calculation for w_c=2 is R←$2^3$R+2C. R←$2^3$R+2C shows shifting the value of a variable R upwards by the number of bits shown by the window width (here, 3 bits), and then adding 2C to the variable R.

The window calculation by the scalar multiplication unit 229 for w_c=2 is R←2($2^2$R+C).

Due to the fact that 2($2^2$R+C)=$2^3$R+2C, the result of the conventional window calculation for w_c=2 and the result of the window calculation by the scalar multiplication unit 229 are the same.

Here, R←2($2^2$R+C) is calculated by the scalar multiplication unit 229 by calculating R←2×R, R←2×R, R←R+C, R←2×R (see step S166).

This is based on the fact that 2($2^2$R+C)=2×(2×(2×R)+C).

Therefore, in the window calculation by the scalar multiplication unit 229 for w_c=2, a plurality of basic calculations are performed in the following order: doubling; doubling; addition; and doubling.

Here, the addition is adding a point obtained by multiplying a point C with w_c/2$^r$.

In this way, the number of times that basic calculations are included in the window calculation performed by the scalar multiplication unit 229 for w_c=2 is "4".

(d) When w_c=3

The conventional window calculation for w_c=3 is R←2$^3$R+3C. R←2$^3$R+3C shows shifting the value of a variable R upwards by the number of bits shown by the window width (here, 3 bits), and then adding 3C to the variable R.

The window calculation by the scalar multiplication unit 229 for w_c=3 is R←2$^3$R+3C.

As such, the conventional window calculation for w_c=3 and the window calculation by the scalar multiplication unit 229 are the same.

Here, R←2$^3$R+3C is calculated by the scalar multiplication unit 229 by calculating R←2×R, R←2×R, R←2×R, R←R+3C (see step S167).

This is because 2$^3$R+3C=2×(2×(2×R))+3C.

Therefore, in the window calculation by the scalar multiplication unit 229 for w_c=3, a plurality of basic calculations are performed in the following order: doubling; doubling; doubling; and addition.

In this way, the number of times that basic calculations are included in the window calculation performed by the scalar multiplication unit 229 for w_c=3 is "4".

(e) When w_c=4

The conventional window calculation for w_c=4 is R←2$^3$R+4C. R←2$^3$R+4C shows shifting the value of a variable R upwards by the number of bits shown by the window width (here, 3 bits), and then adding 4C to the variable R.

The window calculation by the scalar multiplication unit 229 for w_c=4 is R←2$^2$(2R+C).

Due to the fact that 2$^2$(2R+C)=2$^3$R+4C, the result of the conventional window calculation for w_c=4 and the result of the window calculation by the scalar multiplication unit 229 are the same.

Here, R←2$^2$(2R+C) is calculated by the scalar multiplication unit 229 by calculating R←2×R, R←R+C, R←2×R, R←2×R (see step S168).

This is based on the fact that 2$^2$(2R+C)=2×2×((2×R)+C)).

Therefore, in the window calculation by the scalar multiplication unit 229 for w_c=4, a plurality of basic calculations are performed in the following order: doubling; addition; doubling; and doubling.

Here, the addition is adding a point obtained by multiplying a point C with w_c/2$^r$.

In this way, the number of times that basic calculations are included in the window calculation performed by the scalar multiplication unit 229 for w_c=4 is "4".

(f) When w_c=−3

The conventional window calculation for w_c=−3 is R←2$^3$R−3C. R←2$^3$R−3C shows shifting the value of a variable R upwards by the number of bits shown by the window width (here, 3 bits), and then adding −3C to the variable R (in other words, subtracting 3C from the variable R).

The window calculation by the scalar multiplication unit 229 for w_c=−3 is R←2$^3$R+3C.

As such, the conventional window calculation for w_c=−3 and the window calculation by the scalar multiplication unit 229 are the same.

Here, R←2$^3$R−3C is calculated by the scalar multiplication unit 229 by calculating R←2×R, R←2×R, R←2×R, R←R+(−3C) (see step S161).

This is based on the fact that 2$^3$R−3C=2×(2×(2×R))+(−3C).

Therefore, in the window calculation by the scalar multiplication unit 229 for w_c=−3, a plurality of basic calculations are performed in the following order: doubling; doubling; doubling; and addition (here this is subtraction).

In this way, the number of times that basic calculations are included in the window calculation performed by the scalar multiplication unit 229 for w_c=−3 is "4".

(g) When w_c=−2

The conventional window calculation for w_c=−2 is R←2$^3$R−2C. R←2$^3$R−2C shows shifting the value of a variable R upwards by the number of bits shown by the window width (here, 3 bits), and then adding −2C to the variable R (in other words, subtracting 2C from the variable R).

The window calculation by the scalar multiplication unit 229 for w_c=−2 is R←2(2$^2$R−C).

Due to the fact that 2(2$^2$R−C)=2$^3$R−2C, the result of the conventional window calculation for w_c=−2 and the result of the window calculation by the scalar multiplication unit 229 are the same.

Here, R←2(2$^2$R−C) is calculated by the scalar multiplication unit 229 by calculating R←2×R, R←2×R, R←R+(−C), and R←2×R (see step S162).

This is based on the fact that 2(2$^2$R−C)=2×(2×(2×R)+(−C)).

Therefore, in the window calculation by the scalar multiplication unit 229 for w_c=−2, a plurality of basic calculations are performed in the following order: doubling; doubling; addition (subtraction here); and doubling.

Here, the subtraction is subtraction of a point obtained by multiplying a point C with |w_c/2$^r$|.

In this way, the number of times that basic calculations are included in the window calculation performed by the scalar multiplication unit 229 for w_c=−2 is "4".

(h) When w_c=−1

The conventional window calculation for w_c=−1 is R←2$^3$R−C. R←2$^3$R−C shows shifting the value of a variable R upwards by the number of bits shown by the window width (here, 3 bits), and then adding −C to the variable R (in other words, subtracting C from the variable R).

The window calculation by the scalar multiplication unit 229 for w_c=−1 is R←2$^3$R−C.

As such, the conventional window calculation for w_c=−1 and the window calculation by the scalar multiplication unit 229 are the same.

Here, R←2$^3$R−C is calculated by the scalar multiplication unit 229 by calculating R←2×R, R←2×R, R←2×R, R←R+(−C) (see step S163).

This is based on the fact that 2$^3$R−3C=2×(2×(2×R))+(−C).

Therefore, in the window calculation by the scalar multiplication unit 229 for w_c=−1, a plurality of basic calculations are performed in the following order: doubling; doubling; doubling; and addition (subtraction here).

In this way, the number of times that basic calculations are included in the window calculation performed by the scalar multiplication unit 229 for w_c=−1 is "4".

1.4 Operations by the Elliptic Curve Calculation Unit 208

Figure 13:
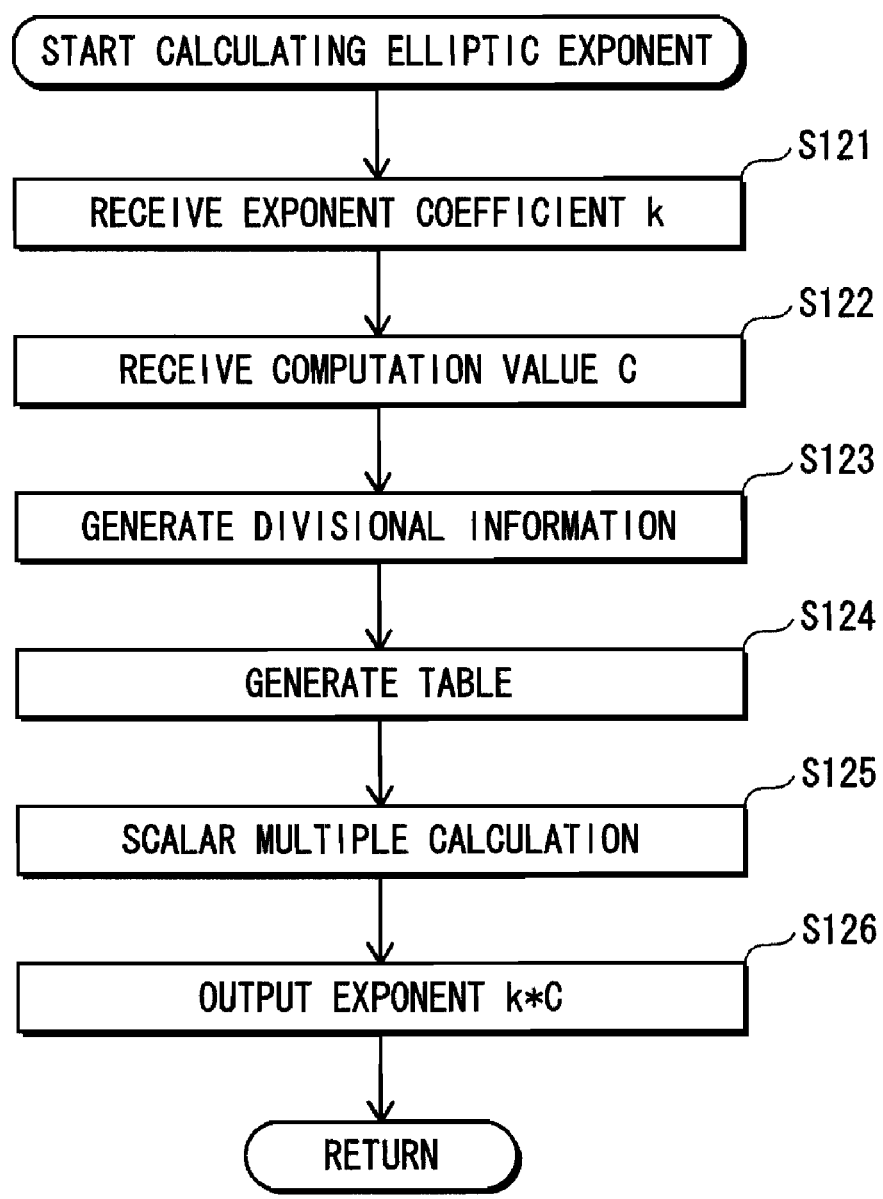
FIG. 13 is a flowchart showing operations of the elliptic curve adding unit 208.

The following describes operations by the elliptic curve calculation unit 208 with use of the flowchart shown in FIG. 13.

The input unit 230 receives an exponent coefficient k from the encryption processing unit 202, writes the received exponent coefficient k to the exponent coefficient storage unit 221 (step S121), receives a computation value C from the encryption processing unit 202, and writes the received computation value C to the operand value storage unit 224 (step S122).

Next, the divisional information generation unit 222 generates an integer string {w_i} that is part of the exponent coefficient k, and stores the generated integer string {w_i} in the divisional information storage unit 223 (step S123).

Next, the table generation unit 225 generates a table {P_i} using the computation value C, and stores the table {P_i} in the table storage unit 228 (step S124).

Next, the scalar multiple calculation unit 229 calculates the exponent k*C using the integer string {w_i} in the divisional information storage unit 223 and the table {P_i} stored in the table storage unit 228 (step S125).

Next, the output unit 231 receives the exponent k*C from the scalar multiplication unit 229, and outputs the received exponent k*C to the encryption processing unit 202 (step S126).

1.5 Structure of IC Card 100

As shown in FIG. 1, the IC card 100 is composed of a private key storage unit 101, a decryption processing unit 102, a communication unit 103, control unit 104, an information storage unit 105 and an elliptic curve calculation unit 108.

In concrete terms, the IC card 100 is a computer system composed of a microprocessor, a ROM, a RAM, and so on. A computer program is stored in the RAM, and the IC card 100 achieves part of its functions by the microprocessor operating according to the computer program.

(1) Information Storage Unit 105 and Private Key Storage Unit 101

The information storage unit 105 stores a prime p, a coefficient of an elliptic curve E(Fp) and a base point B, and has an area for storing generated decrypted points Pm'.

The private key storage unit 101 stores a private key ks.

(2) Communication Unit 103

The communication unit 103 receives a first ciphertext s1 and a second ciphertext s2 from the point issuing apparatus 200. Upon receiving the first ciphertext s1 and the second ciphertext s2, the communication unit 103 notifies the control unit 104 of the reception. The communication unit 103 also outputs the received first ciphertext s1 and ciphertext s2 to the decryption processing unit 102.

(3) Control Unit 104

The control unit 104 receives notification from the communication unit 103 that the communication unit 103 has received the first ciphertext s1 and the second ciphertext s2. Upon receiving the notification, the control unit 104 outputs an instruction, to the decryption processing unit 102, showing decryption of the first ciphertext s1 and the second ciphertext s2 to generate decrypted points.

(4) Decryption Processing Unit 102

The decryption processing unit 102 receives, from the control unit 104, an instruction showing decryption of the first ciphertext s1 and the second ciphertext s2 to generate decrypted points. The decryption processing unit 102 also receives the first ciphertext s1 and the second ciphertext s2 from the communication unit 103.

Upon receiving the instruction, the decryption processing unit 102 reads the private key ks from the private key storage unit 101, and then outputs the received first ciphertext s1 as a computation value k to the elliptic curve calculation unit 108, and outputs the reads private key ks as an exponent coefficient C to the elliptic curve calculation unit 108. Next, the decryption processing unit 102 receives a calculation result ks*s1 from the elliptic curve calculation unit 108, and calculates decrypted points Pm'=second ciphertext s2 xor (x coordinate value of calculation result ks*s1).

Here, $$Pm' = s2 \text{ xor } (x \text{ coordinate value of } ks * s1)$$
$$= (Pm \text{ xor } (x \text{ coordinate value of } r * Kp))$$
$$\quad \text{xor } (x \text{ coordinate value of } ks \cdot r * B)$$
$$= Pm \text{ xor } (x \text{ coordinate value of } r \cdot ks * B)$$
$$\quad \text{xor } (x \text{ coordinate value of } r \cdot ks * B)$$
$$= Pm$$

Consequently, it is evident that the decrypted points Pm' is identical to the points Pm.

Next, the decryption processing unit 102 writes the generated decrypted points Pm' to the information storage unit 105.

(5) Elliptic Curve Calculation Unit 108

The elliptic curve calculation unit 108 has the same structure as the elliptic curve calculation unit 208 in the point issuing apparatus 200, and therefore a description thereof is omitted.

The elliptic curve calculation unit 108 receives a computation value k and an exponent coefficient C from the decryption processing unit 102, calculates an exponent k*C, and outputs the calculated exponent k*C to the decryption processing unit 102.

1.6 Operations of the Point Issuing System 10

Figure 14:
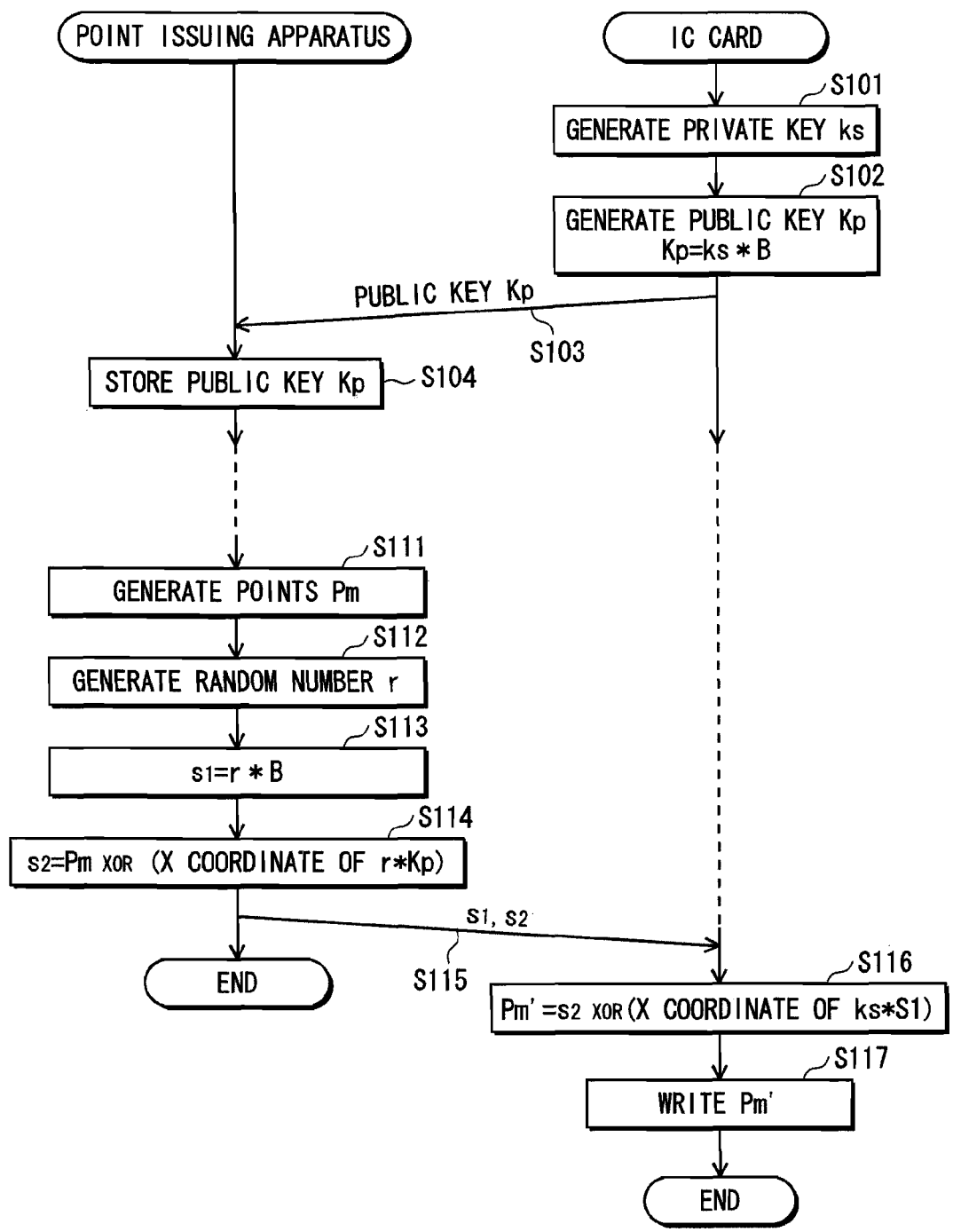
FIG. 14 is a flowchart showing operations of a point issuing system 10.

The following describes operations of the point issuing system 10 with use of the flowchart shown in FIG. 14.

(1) Operations for Generating the Private Key ks and the Public Key Kp

The following operations are performed before the point issuing apparatus 200 issues points.

The decryption processing unit 102 of the IC card 100 generates a private key ks, and writes the generated private key ks to the private key storage unit 101 (step S101). The decryption processing unit 102 then reads the base point B from the information storage unit 105, and subjects the generated private key ks and the read base point B to elliptic exponent calculation, to generate a public key Kp=ks*B. The elliptic exponent calculation here is performed by the elliptic curve calculation unit 108 (step S102). Next, the decryption processing unit 102 transmits the generated public key Kp to the point issuing apparatus 200 via the communication unit 103 (step S103).

The encryption processing unit 202 of the point issuing apparatus 200 receives the public key Kp from the IC card 100 via the communication unit 203, and writes the received public key Kp to the public key storage unit 201 (step S104).

Although the IC card 100 is described as generating the private key ks, generating the public key Kp based on the generated public key Kp, and transmitting the generated public key Kp to the point issuing apparatus 200 here, the following alternative is possible.

That is, the point issuing system 10 further includes a key management apparatus (public key generation apparatus). The IC card 100 generates the private key ks, and stores the generated private key ks internally.

The key management apparatus has: a private key storage unit that securely acquires the private key ks from the IC card 100 and stores the acquired private key ks; a base point storage unit that stores a base point B; an elliptic curve calculation unit that reads the private key ks from the private key storage unit, reads the base point B from the base point storage unit, and generates a public key K ks*B using the private key ks and the base point B; and a transmission unit that transmits the generated public key Kp to the point issuing apparatus 200. Here, the elliptic curve calculation unit in the key management apparatus has the same structure as the elliptic curve calculation unit in the IC card 100.

(2) Operations for Issuing Points

The control unit 204 of the point issuing apparatus 200 generates points Pm, writes the generated points Pm to the information storage unit 205, and then outputs, to the encryption processing unit 202, an instruction showing encrypting the points Pm and transmitting the encrypted points Pm to the IC card 100 (step S111).

Upon receiving the instruction showing encrypting the points Pm and transmitting them to the IC card 100, the encryption processing unit 202 generates a random number (step S112), reads the base point B from the information storage unit 205, outputs the generated random number r as an exponent coefficient to the elliptic curve calculation unit 208, outputs the read base point B as an exponent to the elliptic curve calculation unit 208, receives an exponent r*B as a calculation result from the elliptic curve calculation unit 208, and lets first ciphertext s1=exponent r*B (step S113).

Next, the encryption processing unit 202 reads the public key Kp from the public key storage unit 201, outputs the generated random number r as an exponent coefficient to the elliptic curve calculation unit 208, outputs the read public key Kp as an exponent to the elliptic curve calculation unit 208, and receives an exponent r*Kp as a calculation result from the elliptic curve calculation unit 208. The encryption processing unit 202 reads the points Pm from the information storage unit 205, and adds the read points Pm and the received exponent r*Kp, to generate second ciphertext s2=points Pm xor (x coordinate value of exponent r*Kp) (step S114).

Next, the encryption processing unit 202 transmits the generated first ciphertext s1 and second ciphertext s2 to the IC card 100 via the communication unit 203 (step S115).

The decryption processing unit 102 receives the first ciphertext s1 and the second ciphertext s2 from the point issuing apparatus 200 via the communication unit 103 (step S115).

Next, the decryption processing unit 102 reads the private key ks from the private key storage unit 101, outputs the received first ciphertext s1 as a computation value to the elliptic curve calculation unit 108, and outputs the read private key ks as an exponent coefficient to the elliptic curve calculation unit 108. The elliptic curve calculation unit 108 calculates ks*s1, and the decryption processing unit 102 receives a calculation result ks*s1 from the elliptic curve calculation unit 108, and calculates decrypted points Pm'=second ciphertext s2 xor (x coordinate value of calculation result ks*s1) (step S116).

Next, the decryption processing unit 102 writes the decrypted points Pm' obtained as a result of the calculation, to the information storage unit 105 (step S117).

2. Second Embodiment

The following describes a digital signature system (not illustrated) as another embodiment of the present invention.

The digital signature system is composed of a user A apparatus (also referred to as a signature generation apparatus), a user B apparatus (also referred to as a signature verification apparatus), and a management center apparatus (also referred to as a management apparatus). Note that none of these apparatuses are illustrated. The user A apparatus, the user B apparatus and the management center apparatus are connected to each other via the Internet.

In concrete terms, each of the user A apparatus, the user B apparatus, and the management center apparatus is a computer system composed of a microprocessor, a ROM, a RAM, a hard disk unit, a display unit, a keyboard, a mouse, and so on. A computer program is stored in the RAM or the hard disk unit, and the apparatus achieves part of its functions by the microprocessor operating in accordance with the computer programs.

Each of the user A apparatus, the user B apparatus and the management center apparatus is an information security apparatus that processes information securely using elliptic curve calculation that calculates a point k*C by multiplying a point C of an elliptic curve E with a coefficient k that is an integer less than a prime p, based on a discrete logarithmic problem on the elliptic curve E defined over a residue field F with the prime p being a modulus.

Here, processing information securely refers to processing information in a manner that when communicating the information between two parties, the information will not be known to a third party.

The user A apparatus transmits a digital signature and a message to the user B apparatus, and the user B apparatus receives the digital signature data and the message, and performs signature verification using the received digital signature data.

Here, assume an elliptic curve E(Fp) defined over a residue field Fp with a modulus p, and that the order of E is q, and B is a base point of the elliptic curve E.

The user A apparatus is composed of: a private key generation unit that generates a private key xA; a private key transmission unit that transmits the generated private key xA to the management center apparatus; a message storage unit that stores a message m to be transmitted; a parameter reception unit that receives a prime p, a coefficient of an elliptic curve E, and a base point B from the management center apparatus; a parameter storage unit that stores the received prime p, coefficient of the elliptic curve E, and base point B; a random number generation unit that generates a random number r; a signature generation unit that generates first signature data R1=(rx,ry)=r*B, and calculates second signature data s from s×r=m+rx×XA (mod q); a transmission unit that transmits the obtained signature data (R1, s) and the message m to the user B apparatus; and an elliptic curve calculation unit that performs elliptic exponent calculation of a point on an elliptic curve.

The management center apparatus is composed of : an acquisition unit that securely acquires the private key xA from the user A apparatus s ; a parameter storage unit that stores the prime p, the coefficient of an elliptic curve E, and the base point B; a public key calculation unit that calculates a public key YA=xA*G; a disclosing unit that makes public the prime p, the coefficient on the elliptic curve E, and a base point G; a transmission unit that transmits the public key YA to the user B apparatus via the Internet; and an elliptic curve calculation unit that performs elliptic exponent calculation of a point on an elliptic curve.

The user B apparatus is composed of : a parameter reception unit that receives a prime p, a coefficient of an elliptic curve E, and a base point G from the management center apparatus; a parameter storage unit that stores the acquired prime p, coefficient of the elliptic curve E, and base point G; a public key reception unit that receives a public key YA from the management center apparatus; a public key storage unit that stores the received public key YA; a signature data reception unit that receives the signature data (R1, S) from the user A apparatus; a message reception unit that receives the message m from the user A apparatus; a verification unit that calculates S*R1 and m*G+rx*YA, judges whether or not S*R1=m*G+rx*YA is established, and when established outputs success information showing that verification was successful, and when verification fails, outputs failure information showing that verification failed; and an elliptic curve calculation unit that performs elliptic exponent calculation of a point on an elliptic curve.

The elliptic curve calculation unit in each of the user A apparatus, the user B apparatus, and the management center apparatus are the same as the elliptic curve calculation unit 208 shown in the first embodiment.

Figure 15:
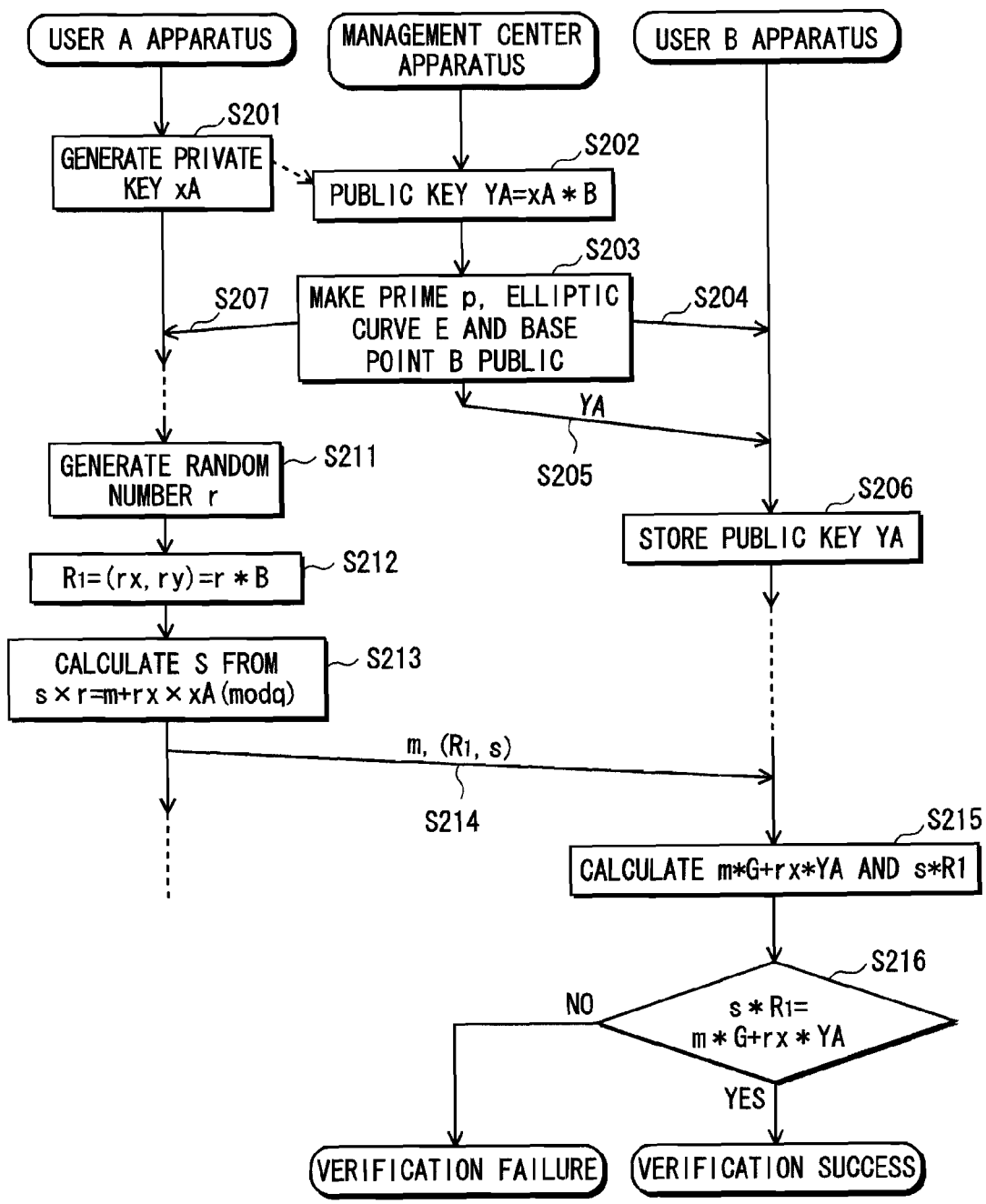
FIG. 15 is a flowchart showing operations of a digital signature system.

The following describes operations by the digital signature system with use of the flowchart shown in FIG. 15.

Generation of Private Key xA and Public Key YA

The user A apparatus generates a private key xA (step S201).

The management center apparatus securely acquires the private key xA from the user A apparatus, and calculates public key YA=xA*B using the acquired private key xA (step S202).

Next, the management center apparatus makes public the prime p, the coefficient elliptic curve E and the base point B (step S204, step S207), and transmits the public key YA to the user B apparatus via the Internet (step S205).

The user B apparatus acquires the prime p, the coefficient of the elliptic curve E, and the base point B (step S204), receives the pubic key YA (step S205), and stores the received public key YA internally (step S206).

The user A apparatus also acquires the prime p, the coefficient of the elliptic curve E, and the base point G (step S207).

Digital Signature Generation and Signature Verification

The user A apparatus generates a random number r (step S211), and generates first digital signature data R1=(rx, ry)=r*B (step S212), and calculates second signature data s from s×r=m+rx×xA (mod q) (step S213). Here, m is the message transmitted from the user A apparatus to the user B apparatus.

Next, the user A apparatus transmits the obtained signature data (R1, s) and the message m to the user B apparatus (step S214).

The user B apparatus receives signature data (R1, s) and the message m from the user A apparatus (step S214).

Next, the user B apparatus calculates s*R1 and m*G+ rx*YA (step S215), and judges whether or not S*R1=m*G+ rx*YA is established (step S216). When established (YES at step S216), this means that verification is successful, and the identity of the user A apparatus is confirmed. When not established (NO at step S216), this means that verification fails, and the identity of the user A apparatus is not confirmed.

5. Third Embodiment

The following describes a key sharing system (not illustrated) as another embodiment of the present invention.

The key sharing system is composed of a user A apparatus (also referred to as a key usage apparatus), a user B apparatus (also referred to as a key usage apparatus), and a management center apparatus (also referred to as a management apparatus). Note that none of these apparatuses is illustrated. The user A apparatus, the user B apparatus and the management center apparatus are connected to each other via the Internet. In concrete terms, each of the user A apparatus, the user B apparatus, and the management center apparatus is a computer system composed of a microprocessor, a ROM, a RAM, and so on. The apparatus achieves its functions by the microprocessor operating in accordance with a computer program.

Each of the user A apparatus and the user B apparatus is an information security apparatus that processes information securely using elliptic curve calculation that calculates a point k*C by multiplying a point C of an elliptic curve E with a coefficient k that is an integer less than a prime p, based on a discrete logarithmic problem on the elliptic curve E defined over a residue field F with a prime p being a modulus.

Here, processing information securely refers to processing information in a manner that when communicating the information between two parties, the information will not be known to a third party.

The user A apparatus and the user B apparatus acquire an identical shared key without the key being known to a third party.

The management center apparatus is composed of: a selection unit that selects a coefficient of an elliptic curve E(Fp) and a base point B; a parameter storage unit that stores the selected coefficient elliptic curve E, base point B, and prime p; and a disclosing unit that makes public the prime p, the elliptic curve E(Fp) and the base point G.

Here, assume an elliptic curve E defined over a residue field Fp with the prime p being a modulus, and B is a base point on the elliptic curve E.

The user A apparatus is composed of a parameter acquisition unit that acquires a prime p, a coefficient of an elliptic curve E and a base point B from the management center apparatus; a private key setting unit that sets a private key xA using a random number; a public key calculation unit that calculates public key YA=xA*B, a public key transmission unit that transmits the calculated public key YA to the user B apparatus; a public key reception unit that receives a public key YB from the user B apparatus; a shared key calculation unit that calculates shared key xA*YB=(xA×xB)*B; and a elliptic curve calculation unit that performs elliptic exponentiation of a point on an elliptic curve according to an instruction from the public key calculation unit or the shared key calculation unit.

The user B apparatus has a similar structure to the user A apparatus.

The user B apparatus is composed of: a parameter acquisition unit that acquires a prime p, a coefficient of an elliptic curve E and a base point B from the management center apparatus; a private key setting unit that sets a private key xB using a random number; a public key calculation unit that calculated public key YB=xB*B; a public key transmission unit that transmits the calculated public key YB to the user A apparatus; a public key reception unit that receives a public key YA from the user A apparatus; a shared key calculation unit that calculates shared key xB*YA=(xB×xA)*B; and an elliptic curve calculation unit that performs elliptic exponentiation of a point on an elliptic curve according to an instruction from the public key calculation unit or the shared key calculation unit.

The elliptic curve calculation unit in each of the user A apparatus and the user B apparatus is the same as the elliptic curve calculation unit in the point issuing apparatus 200 of the first embodiment.

Figure 16:
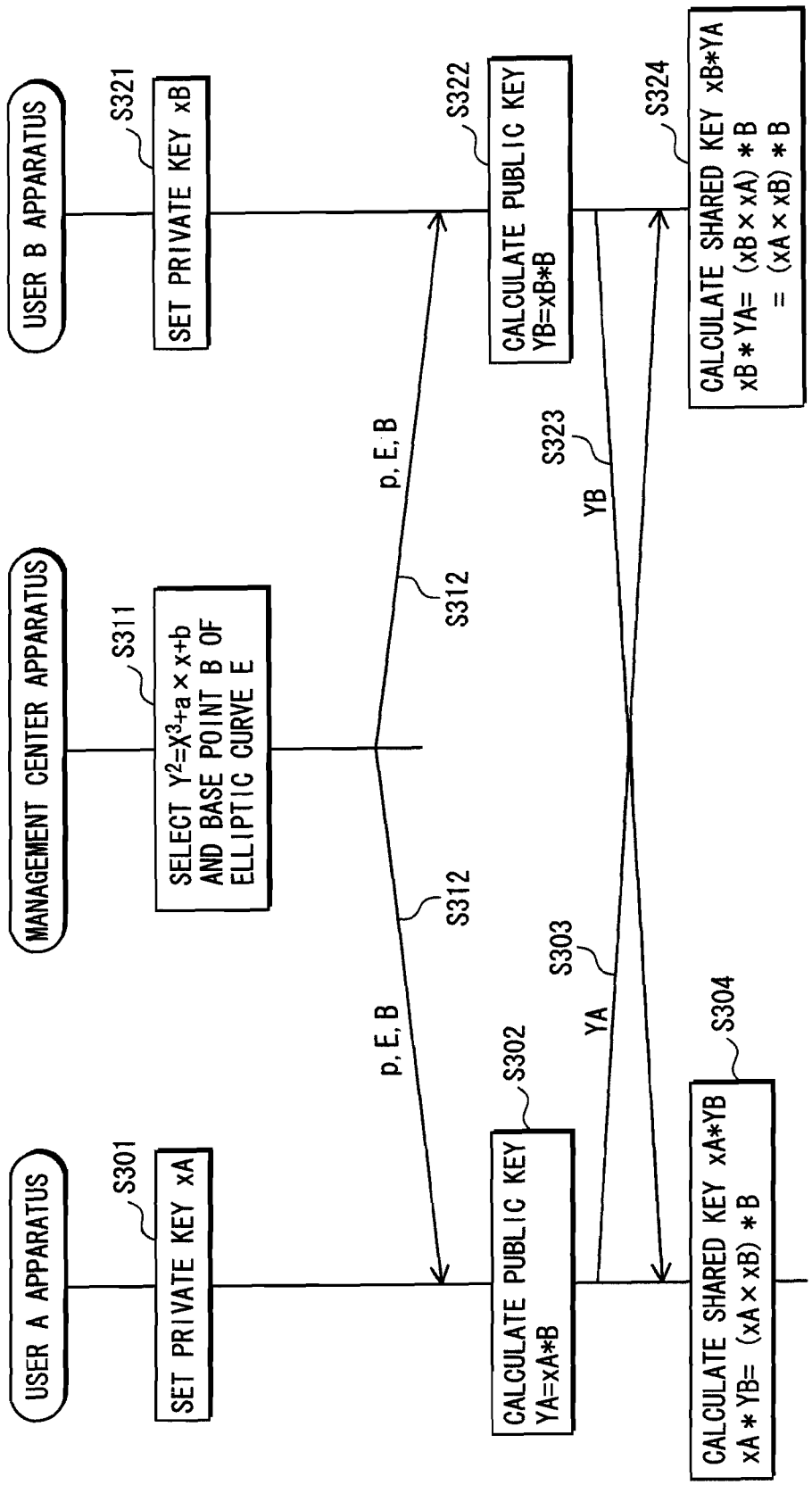
FIG. 16 is a flowchart showing operations of a key sharing system.

The following describes operations by the key sharing system, with use of the flowchart shown in FIG. 16.

The management center apparatus selects a coefficient of the elliptic curve E and a base point B (step S311), and makes the prime p and the coefficient of the elliptic curve E and the base point B public (step S312).

The user A apparatus sets a private key xA (step S301), calculates a public key YA=xA*B (step S302), and transmits the public key YA to the user B apparatus (step S303).

The user B apparatus, meanwhile, sets a private key xB (step S321), calculates the public key YB=xB*B (step S322), and transmits the public key YB to the user A apparatus (step S323).

The user A apparatus calculates shared key xA*YB=(xA× xB)*B (step S304).

The user B apparatus, meanwhile, calculates shared key xB*YA=(xB×xA)*B (step S324).

Here, $$\text{shared key } xB*YA = (xB \times xA)*B$$
$$= (xA \times xB)*B$$
$$= \text{shared key } xA*YB.$$

In this way, the user A apparatus and the user B apparatus are able to acquire an identical shared keys without the shared key being known to a third party.

6. Effects of the First Embodiment

Since the elliptic curve adding unit 226 and the elliptic curve doubling unit 227 in the elliptic curve calculation unit 208 of the point issuing apparatus of the first embodiment perform the same calculations in the same order as each other (see FIG. 4 to FIG. 5), an attacker who analyzes the power waveforms is unable to determine based on the power wave form which of an elliptic curve adding calculation and an elliptic curve doubling operation is being performed.

Furthermore, since the elliptic curve additions and elliptic curve doublings are four calculations in total regardless of what the value of w_c is according to the counter c, the elliptic curve additions and elliptic curve doublings are four calculations in total, and do not rely on the value of the exponent coefficient. Therefore, even if the number of calculations is known to an attacker, information relating to the exponent coefficient will not be leaked to the attacker. Consequently, the first embodiment is safe from simple power analysis.

Furthermore, in the case that the window width sw=3, the only point stored in the table in the table storage unit 228 other than P_1=C is the one point P_2=3*C. With conventional methods for countering simple power analysis, the points stored in the table other than P_1=C are the three points P_2, P_3, and P_4. The first embodiment reduces the table size to one third of that in a conventional method.

Although in the first embodiment the total number of calculations for each piece of divisional information of sw bits is made to be a set number, the overall number of calculations for each single exponent coefficient may instead be made to be a set number. In such a case, the number of calculations is measured while the calculation processing is performed, in order to adjust the overall number of calculations for each single exponent coefficient. In comparison, in the first embodiment, since the total number of calculations for each sw bit is a set number, there is no need to also pay attention to the calculations overall for each single multiplication coefficient, and therefore, this has a further effect that control can be performed easily.

The above-described effect is the same for the second and third embodiments.

7. Other Modifications

The above-described embodiments are simply examples of the present invention. The present invention is by no means limited to these embodiments, and may by implemented in various embodiments that do not depart from the scope of the present invention. For instance, cases such as the following are included in the present invention.

(1) In the first embodiment, the table generation unit 225 performs elliptic curve addition and elliptic curve doubling using the elliptic curve adding unit 226 and the elliptic curve doubling unit 227. However, the table generation unit 225 may instead execute normal elliptic curve addition and elliptic curve doubling without the dummy calculation in the elliptic curve adding unit 226 and the elliptic curve doubling unit 227.

(2) Although sw=3 in the embodiments, sw may have a value of "2" or may have a value of "4" or greater. In such a case, the window calculations in accordance with the value of w_c in the scalar multiple calculation unit 229 are as follows (operations corresponding to step S157 and steps S161 to S168 in FIG. 10 to FIG. 11).

In the window calculation in accordance with the value of w_c, basic calculations are performed (sw+1) times.

(i) When w_c has a value other than 0, and a negative integer t exists according to which w_c can be divided by $2^t$ but cannot be divided by $2^{(t+1)}$, the (sw−t+1) th basic calculation of the (sw+1) times is R←ECA(R, sgn (w_c)) *P((abs(w_c/$2^t$)+1)/2)), and the other sw basic calculations of the (sw+1) times are R←ECD(R).

Here, sgn (w_c) is the sign of w_c. When w_c>0, sgn (w_c)=1, and when w_c<0, sgn (w_c)=−1.

Furthermore, abs (w_c) is the absolute value of w_c.

(ii) When w_c=0, the basic calculation R←ECD(R) is performed sw times, and then D-ECA(R, P_1) is executed. For example, when sw=5 and w_c=−12, the calculations are R←ECD(R), R←ECD(R), R←ECD(R), R←ECA(R,−P_2), R←ECD (R) and R←ECD(R).

When sw=2, since no points exist in the table other than P_1, it is unnecessary to calculate a new point to find the elements of the table. Therefore, the table generation unit 225 and the table storage unit 228, as well as the processing by the table generation unit 225, are unnecessary. Since no point exists in the table other than P_1, the table size is "0", and therefore this is remarkably effective in reducing the table.

(3) The calculation conversion table 320 in the case of sw=3 is shown in FIG. 12. Here, a calculation conversion table 330 in the case of sw=4 is shown in FIG. 17.

Here, since the window width is "four bits", there are 16 possible values of w_c, namely 0, 1, 2, 3, 4, 5, 6, 7, 8, −7, −6, −5, −4, −3, −2 and −1.

Next, a description is given of the conventional window calculation, the window calculation by the scalar multiplication unit 229, basic calculation order, and the basic calculation times in the case of each value of w_c.

(a) When w_c=0

The conventional window calculation for w_c=0 is R←$2^4$R. R←$2^4$R shows shifting the value of a variable R upwards by the number of bits shown by the window width (here, 4 bits).

The window calculation by the scalar multiplication unit 229 for w_c=0 is R←$2^4$R and D←R+C. R←$2^4$R is as described above. D←R+C is a dummy addition that is for adjusting the types and number of basic calculations in the window calculation in the case w_c=0 so as to be the same as the types and number of basic calculations in the window basic calculation in other cases (i.e., in cases in which w_c≠0).

Here, R←$2^4$R is calculated by the scalar multiplication unit 229 by calculating R←2×R, R←2×R, R←2×R, and R←2×R.

This is based on the fact that $2^4R=2\times(2\times(2\times(2\times R)))$.

Therefore, in the window calculation by the scalar multiplication unit 229 for w_c=0, a plurality of basic calculations are performed in the following order: doubling; doubling; doubling; doubling; and dummy addition.

In this way, the number of times that basic calculations are included in the window calculation performed by the scalar multiplication unit 229 for w_c=0 is "5".

(b) When w_c=1, 3, 5, 7, −7, −5, −3, or −1

The respective conventional calculations in the cases of w_c=1, 3, 5, 7, −7, −5, −3, and −1 are R←$2^4$R+C, R←$2^4$R+3C, R←$2^4$R+5C, R←$2^4$R+7C, R←$2^4$R−7C, R←$2^4$R−5C, R←$2^4$R−3C, and R←$2^4$R−1C.

R←$2^4$R+C shows shifting the value of a variable R upwards by the number of bits shown by the window width (here, 4 bits), and then adding C to the variable R. This applies similarly to the other calculations.

Furthermore, the window calculations by the scalar multiple calculation unit 229 in the cases of w_c=1, 3, 5, 7, −7, −5, −3, and −1, are the same as conventional window calculations.

In the window calculation by the scalar multiplication unit 229 in each of the described cases, a plurality of basic calculations are performed in the following order: doubling; doubling; doubling; doubling; and addition.

In this way, the number of times that basic calculations are included in the window calculation performed by the scalar multiplication unit 229 for the aforementioned cases is "5".

(c) When w_c=2, 4, 6, 8, −6, −4, or −2

The respective conventional calculations in the cases of w_c=2, 4, 6, 8, −6, −4, or −2 are R←$2^4$R+2C, R←$2^4$R+4C, R←$2^4$R+6C, R←$2^4$R+8C, R←$2^4$R−6C, R←$2^4$R−4C, and R←$2^4$R−2C.

R←$2^4$R+2C shows shifting the value of a variable R upwards by the number of bits shown by the window width (here, 4 bits), and then adding 2C to the variable R. This applies similarly to the other calculations.

The window calculations by the scalar multiple calculation unit 229 in the cases of w_c=2, 4, 6, 8, −6, −4, or −2 are R←2($2^3$R+C), R←$2^2$($2^2$R+C), R←2($2^3$R+3C), R←$2^3$(2R+C), R←2($2^3$R−3C), R←$2^2$($2^2$R−C), and R←2($2^3$R−C). The results of these calculations are the same as the results of the conventional window calculations.

Here, when w_c=2 for example, R←2(2 R+C) is calculated by the scalar multiplication unit 229 by calculating R←2×R, R←2×R, R←2×R, R←R+C, and R←2×R.

Therefore, in the window calculation by the scalar multiplication unit 229 for w_c=2, a plurality of basic calculations are performed in the following order: doubling; doubling; doubling; addition; and doubling.

In this way, the number of times that basic calculations are included in the window calculation performed by the scalar multiplication unit 229 for w_c=2 is "5".

The cases of w_c=4, 6, 8, −6, −4, and −2 are also as shown in FIG. 17.

(4) Although all exponent coefficients are divided into a fixed length of bit string, namely sw bits, to generate the divisional information in the embodiments, the number of bits is not limited to being a fixed length. If the number of bits of the divisional information is not a fixed length, it is also unnecessary for number of calculations processes performed by the scalar multiple calculation unit using the divisional information to be a fixed number. In this case, the number of calculation processes per piece of divisional information may depend on the bit length of the divisional information, but should not depend on information other than the bit length of the divisional information.

When the number of bits of the divisional information is a bits, the window calculation unit corresponding to the value of the divisional information performs successive calculations (a+1) times. Here, the (a−t+1)th time of the plurality of calculations is the addition on the elliptic curve E, and the other calculations are doubling on the elliptic curve E.

Furthermore, when the number of bits of the divisional information is b bits (here, a≠b), the window calculation unit corresponding to the value of the divisional information performs successive calculations (b+1) times. Here, the (b−t+1)th time of the plurality of calculations is the addition on the elliptic curve E, and the other calculations are doubling on the elliptic curve E.

(5) Although D←ECA(R, P_1) is executed after the sw basic calculations R←ECD(R) when w_c=0 in the described embodiments, the dummy calculation processing may be an addition with another point, or may be a elliptic curve doubling.

(6) Although the described embodiments use a Weierstrass elliptic curve having a shape expressed by a formula $y^2=x^3+a\times x+b$, and use Jacobian coordinates, the present invention is not limited to this structure, and other coordinates (projective coordinates) maybe used. In a case of using other coordinates, a dummy addition may be added to make elliptic curve additions and elliptic curve doublings undistinguishable from each other. Furthermore, a Hessian curve or a Jacobian curve calculable by substituting elliptic curve doubling with elliptic curve addition may be used. In such a case it is unnecessary to provide a dummy calculation in the calculations in the elliptic curve addition and the elliptic curve doubling.

(7) Although exponentiations are performed using an elliptic curve in the described embodiments, exponentiations of a Jacobian group of a super elliptic curve or another algebraic curve may be executed.

(8) The elliptic curve calculation unit of each of the described embodiment of the present invention maybe applied to other elliptic curve encryption such as elliptic ElGamal encryption and PSEC-KEM, or other encryption on an algebraic curve.

For instance, the elliptic curve calculation unit of each of the described embodiments may be applied to exponentiations that use exponent coefficients as a private key in an encryption algorithm of an encryption scheme. Furthermore, the elliptic curve calculation unit of each of the described embodiments may be applied to exponentiations that use exponent coefficients as a private key in a decryption algorithm of an encryption scheme.

Furthermore, the elliptic curve calculation unit of each of the described embodiments may be applied to a signature scheme of an elliptic curve such as an elliptic DSA signature scheme, an elliptic ElGamal signature scheme, an elliptic NR signature scheme, an elliptic MR signature scheme, an elliptic PV signature scheme, or an elliptic AO signature scheme, or to a signature scheme on an algebraic curve.

As described above, the elliptic curve calculation unit may be applied to exponent calculation that uses, as an exponent coefficient, a random number of a signature generation algorithm of a signature scheme on an elliptic curve.

Details of elliptic ElGamal encryption and the elliptic DSA signature scheme can be found in Non-Patent Document 3.

(9) In the point issuing system 10 of the first embodiment, the target of secret communication is points that are bonus points that, for instance, a user who purchases a product or is provided with a service receives from the seller of the product or the provider of the service, and part or all of the points may be used as payment to the seller or service provider when the user next purchases a product or is provided with a service. The point issuing apparatus 200 encrypts the generated points, transmits the encrypted points to the IC card 100, and the IC card 100 decrypts the encrypted points to generate decrypted points, and stores the generated decrypted points.

However, the target of secret communication is not limited to being points.

The present invention can be applied to a monetary settlement system such as the following.

For instance, the target of secret communication may be electronic money that can be used in place of currency. An IC card stores electronic money, and when a user purchases a product, the IC card encrypts and transmits electronic money equivalent to the purchase amount of the product, and decreases the amount of the stored electronic money by the transmitted amount. A register apparatus having a similar structure to the point issuing apparatus 200 is provided instead of the point issuing apparatus 200 in the system, and this register apparatus receives the encrypted electronic money, and then decrypts the received encrypted money, and reproduces and stores the resultant electronic money.

Instead of the aforementioned IC card, an IC card electronic ticket for using a facility such as an art gallery or a museum may store information equivalent to electronic money as described above. An entry management apparatus provided at the entrance to the facility may request an amount of electronic money corresponding to a usage charge for the facility, and the electronic ticket may encrypt and transmit the requested amount of electronic money. The entry management apparatus may then receive the electronic money, decrypt the received encrypted electronic money to generate electronic money, and then store the generated electronic money.

Alternatively, an IC card electronic ticket for using a transportation facility such as a train or a bus may store information equivalent to electronic money as described above. An entry management apparatus provided at an entrance of a station transmits identification information that identifies the station, and the IC card ticket receives and stores the identification information. An exit management apparatus provided at an exit of a station of the transportation facility receives and stores the identification information from the IC ticket, calculates a fare charge based on a fare table using the received identification information and the station at which the exit management apparatus is provided, and requests an amount of electronic money corresponding to the calculated fare charge. The IC card ticket encrypts and transmits the request amount of electronic money, and the exit management apparatus receives the encrypted electronic money, decrypts the received encrypted electronic money to generate electronic money, and then stores the generated electronic money.

In the encryption and decryption in the above-described cases, security is based on the discrete logarithmic problem on an elliptic curve, and elliptic exponentiations are performed. Each of the apparatuses that perform these elliptic exponentiation includes an elliptic curve calculation unit the same as the elliptic curve calculation unit 208.

Each apparatus is an information security apparatus that processes information securely using elliptic curve calculation that calculates a point k*C by multiplying a point C of an elliptic curve E with a coefficient k that is an integer less than a prime p, based on a discrete logarithmic problem on the elliptic curve E defined over a residue field F with the prime p being a modulus.

(10) In monetary settlement systems such as those descried, there are cases in which verification of the authenticity of a transmitted monetary amount, a sender, destination or the like is requested. The digital signature and the digital verification shown in the second embodiment can be applied in such as case.

In the digital signature and signature verification in the above-described case, security is based on the discrete logarithmic problem on an elliptic curve, and elliptic exponentiations are performed. Each of the apparatuses that perform this elliptic exponentiation includes an elliptic curve calculation unit the same as the elliptic curve calculation unit 208.

Each apparatus is an information security apparatus that processes information securely using elliptic curve calculation that calculates a point k*C by multiplying a point C of an elliptic curve E with a coefficient k that is an integer less than a prime p, based on a discrete logarithmic problem on the elliptic curve E defined over a residue field F with the prime p being a modulus.

(11) The target of secret communication is not limited to points or electronic money.

The present invention may be applied to a content distribution system composed of a content encryption apparatus and a content playback apparatus, and the target of secret communication may be digital information such as a movie, video, voice, a novel, or a database. Such content is provided for users by a content provider by selling or renting a recording medium on which the content is recorded. The content provider may also provided the content to users via a digital broadcast, the Internet, or the like.

The content encryption apparatus, which is possessed by the content provider, encrypts a movie that is a digital work and records the encrypted digital work on a DVD. The content playback apparatus, which is possessed by the user, reads the encrypted digital work from the DVD, decrypts the digital work to generate a movie, and reproduces the generated movie as audio and video to perform display and output.

In the encryption and decryption in the above-described cases, security is based on the discrete logarithmic problem on an elliptic curve, and elliptic exponentiations are performed. Each of the content encryption apparatus and the content playback apparatus, which perform this elliptic exponentiation, includes an elliptic curve calculation unit the same as the elliptic curve calculation unit 208.

In the above-described example, a content key for encrypting and decrypting the content maybe the target of the secret communication shown in the first embodiment. In such a case, the content key is encrypted and decrypted in the same way as shown in the first embodiment.

In this case the content is encrypted and decrypted with the content key using a shared key encryption scheme described below.

Each apparatus is an information security apparatus that processes information securely using elliptic curve calculation that calculates a point k*C by multiplying a point C of an elliptic curve E with a coefficient k that is an integer less than a prime p, based on a discrete logarithmic problem on the elliptic curve E defined over a residue field F with the prime p being a modulus.

(12) In the above-described data distribution system, the encryption technique used to encrypt the digital work may be, for example, DES (data encryption standard) or AES (advanced encryption standard). Encryption techniques such as DES and AES are called a shared key encryption scheme (or secret key encryption scheme).

If a shared key encryption scheme is employed in the above-described content distribution system, an issue arises of how to hare a same secret key securely between the encryption apparatus and the playback apparatus in the content distribution system.

The key sharing system of the third embodiment provides means for dealing with this issue.

With the key sharing system of the third embodiment, the secret key can be shared between the content encryption apparatus (which corresponds to the user A apparatus in the third embodiment) and the content playback apparatus (which corresponds to the user B apparatus in the third embodiment) without being known to a third party. After sharing the secret key, an encryption algorithm conforming with the shared key encryption scheme can be applied to generate an encrypted digital work in the content encryption apparatus by encrypting a digital work using the shared secret key. The content playback apparatus can then decrypt the encrypted digital work using the shared secret key.

In the above-described key sharing, security is based on the discrete logarithmic problem on an elliptic curve, and elliptic exponentiations are performed. Each of the content encryption apparatus and the content playback apparatus, which perform this elliptic exponentiation, includes an elliptic curve calculation unit the same as the elliptic curve calculation unit 208.

(13) The described embodiments and modification examples may be applied in cases such as the following.

(a) The described embodiments and modification examples may be applied to secret message transmission. This has been described above as secret communication.

(b) The described embodiments and modification examples may be applied to authentication. Authentication refers to verifying that a message has been sent by a person who is who he/she claims to be, or verifying that a message has not been tampered with. The described embodiments and modification examples may be applied to authentication of identity. Authentication of identity refers to verifying that a party has an access right to data, or has an access right to a facility (a right of entry). Furthermore, the described embodiments and modification examples can be applied to denial prevention. Denial prevention refers to, for instance, counteracting a party who claims not to have agreed to something despite actually having agreed.

(c) The described embodiments and modification examples may be applied to key exchange. Key exchange refers to two people using a broadcast wave to agree to a secret key for using in a certain secret key encryption scheme. This was described above as key sharing.

(d) The described embodiments and modification examples may be applied in coin tossing (also know as bit commitment). Coin tossing refers to, for instance, two chess players who live in different cities using e-mail to decide which player will be white.

(e) The described embodiments and modification examples may be applied to secret sharing. Secret sharing refers to, for instance, certain secret information being usable to k people who work together, but not being usable to only k−1 of the people.

(f) The described embodiments and modification examples may be applied to zero-knowledge proof. Zero-knowledge proof refers to, for instance, a party that has succeeded in solving an arithmetic or combination logic problem convincing another party of the solving by providing only a minimal amount of information, i.e., only the solution.

(14) In concrete terms, each described apparatus is a computer system composed of a microprocessor, a ROM, a RAM, a hard disk unit, a display unit, a keyboard, a mouse, and the like. A computer program is stored in the RAM or the hard disk unit. The computer program is composed of a plurality of instruction codes showing instructions with respect to a computer in order to have predetermined functions achieved. Each apparatus achieves predetermined functions by the microprocessor operating according to the computer programs. In other words, the microprocessor reads one of the instructions included in the computer program at a time, decodes the read instruction, and operates in accordance with the result of the decoding.

(15) All or part of the compositional elements of each apparatus may be composed of one system LSI (Large Scale Integrated circuit). The system LSI is a super-multifunctional LSI on which a plurality of compositional units are manufactured integrated on one chip, and is specifically a computer system that includes a microprocessor, a ROM, a RAM, or the like. A computer program is stored in the RAM. The system LSI achieves its functions by the microprocessor operating according to the computer program.

Furthermore, the units that are the compositional elements of each of the apparatuses may be realized separately with individual chips, or part or all may be included on one chip. Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

(16) Part or all of the compositional elements of each apparatus may be composed of a removable IC card or a single module. The IC card or the module is a computer system composed of a microprocessor, a ROM, a RAM, or the like. The IC card or the module maybe included the aforementioned super-multifunctional LSI. The IC card or the module achieves its functions by the microprocessor operating according to computer program. The IC card or the module may be tamper-resistant.

(17) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD(Blu-rayDisc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(18) As has been described, the present invention is an elliptic curve calculation apparatus that executes scalar multiplication of an elliptic curve with respect to pre-given secret information and an input point on the elliptic curve, including: a divisional information generation unit that divides the secret information to generate divisional information; an elliptic curve adding unit that generates a point obtained as a result of adding two points on the elliptic curve in a group of the elliptic curve; an elliptic curve doubling unit that generates a point obtained as a result of doubling one point on the elliptic curve in a group of the elliptic curve; and a scalar multiplication unit that uses the elliptic curve adding unit and the elliptic curve doubling unit to generate, based on a first point on the elliptic curve and the divisional information, a second point on the elliptic curve, wherein the scalar multiple calculation unit controls such that a value that is a total number of times the elliptic curve adding unit and the elliptic curve doubling unit is a constant number, without relying of information other than a bit length of the secret information, and each of the elliptic curve adding unit and the elliptic curve doubling unit has a multiplication unit that executes multiplication in a field of definition of the elliptic curve, a squaring unit that executes squaring in the field of definition, and an adding unit that executes addition in the field of definition, and the multiplication, the squaring and the addition are executed in the same order in the elliptic curve adding unit and the elliptic curve multiplication unit.

Here, the scalar multiple calculation unit may control such that, based on one piece of the divisional information, a value that is a total number of times the elliptic curve adding unit and the elliptic curve doubling unit are used is a constant number, without relying of information other than a bit length of the piece of divisional information.

Here, the elliptic curve calculation apparatus may further include a table generation unit that, with respect to each of one or more pre-given positive integers, calculates a scalar multiple point on the elliptic curve with the positive integer as a scalar, and store each result in a table, wherein at least one of the two points on the elliptic curve used by the elliptic curve adding unit is one of the scalar multiple points stored in the table.

Here, the divisional information generation unit may divide the secret information into the plurality of pieces of divisional information that each have a predetermined bit length.

Here, the elliptic curve doubling unit may include a dummy multiplication subunit that executes the multiplication that is a dummy that has no effect on a calculation result.

Here, the elliptic curve doubling unit may include a squaring substitution subunit that obtains a result of squaring an element of the field of definition by multiplying of the element with the element.

Here, the positive integer may be an odd number.

Here, the divisional information generation unit may generate a plurality of pieces of the divisional information, each being sw bits, the scalar multiple calculation unit may execute (sw+1) calculation procedures, and when a piece of the divisional information w has a value other than 0 and the piece of divisional information w_is divisible by $2^t$ (t being a non-negative integer) and is not divisible by $2^{(t+1)}$, an (sw−t+1)th of the calculation procedures uses the elliptic curve adding unit, and each other of the calculation procedures uses the elliptic curve doubling unit.

Furthermore, the present invention is an elliptic curve calculation method that executes scalar multiplication of an elliptic curve with respect to pre-given secret information and an input point on the elliptic curve, including: a divisional information generation step of dividing the secret information to generate divisional information; an elliptic curve adding step of generating a point obtained as a result of adding two points on the elliptic curve in a group of the elliptic curve; an elliptic curve doubling step of generating a point obtained as a result of doubling one point on the elliptic curve in a group of the elliptic curve; and a scalar multiplication step of using the elliptic curve adding step and the elliptic curve doubling step to generate, based on a first point on the elliptic curve and the divisional information, a second point on the elliptic curve, wherein the scalar multiple calculation step controls such that a value that is a total number of times the elliptic curve adding step and the elliptic curve doubling step is a constant number, without relying of information other than a bit length of the secret information, and each of the elliptic curve adding step and the elliptic curve doubling step has a multiplication unit that executes multiplication in a field of definition of the elliptic curve, a squaring unit that executes squaring in the field of definition, and an adding unit that executes addition in the field of definition, and the multiplication, the squaring and the addition are executed in the same order in the elliptic curve adding step and the elliptic curve multiplication step.

Here, the scalar multiple calculation step may control such that, based on one piece of the divisional information, a value that is a total number of times the elliptic curve adding unit and the elliptic curve doubling unit are used is a constant number, without relying of information other than a bit length of the piece of divisional information.

Here, the elliptic curve calculation method may further include a table generation step of, with respect to each of one or more pre-given positive integers, calculating a scalar multiple point on the elliptic curve with the positive integer as a scalar, and storing each result in a table, wherein at least one of the two points on the elliptic curve used by the elliptic curve adding step is one of the scalar multiple points stored in the table.

Here, the divisional information generation step may divide the secret information into the plurality of pieces of divisional information that each have a predetermined bit length.

Here, the positive integer may be an odd number.

Here, the divisional information generation step may generate a plurality of pieces of the divisional information, each being sw bits, the scalar multiple calculation step may execute (sw+1) calculation procedures, and when a piece of the divisional information w has a value other than 0 and the piece of divisional information w_is divisible by $2^t$ (t being a non-negative integer) and is not divisible by $2^{(t+1)}$, an (sw−t+1)th of the calculation procedures uses the elliptic curve adding step, and each other of the calculation procedures uses the elliptic curve doubling step.

Furthermore, the present invention is a program executed in an elliptic curve calculation apparatus that executes scalar multiplication of an elliptic curve with respect to pre-given secret information and an input point on the elliptic curve, the program including: a divisional information generation step of dividing the secret information to generate divisional information; an elliptic curve adding step of generating a point obtained as a result of adding two points on the elliptic curve in a group of the elliptic curve; an elliptic curve doubling step of generating a point obtained as a result of doubling one point on the elliptic curve in a group of the elliptic curve; and a scalar multiplication step of using the elliptic curve adding step and the elliptic curve doubling step to generate, based on a first point on the elliptic curve and the divisional information, a second point on the elliptic curve, wherein the scalar multiple calculation step controls such that a value that is a total number of times the elliptic curve adding step and the elliptic curve doubling step is a constant number, without relying of information other than a bit length of the secret information, and each of the elliptic curve adding step and the elliptic curve doubling step has a multiplication unit that executes multiplication in a field of definition of the elliptic curve, a squaring unit that executes squaring in the field of definition, and an adding unit that executes addition in the field of definition, and the multiplication, the squaring and the addition are executed in the same order in the elliptic curve adding step and the elliptic curve multiplication step.

Here, the scalar multiple calculation step may control such that, based on one piece of the divisional information, a value that is a total number of times the elliptic curve adding unit and the elliptic curve doubling unit are used is a constant number, without relying of information other than a bit length of the piece of divisional information.

Here, the elliptic curve calculation method may further include a table generation step of, with respect to each of one or more pre-given positive integers, calculating a scalar multiple point on the elliptic curve with the positive integer as a scalar, and storing each result in a table, wherein at least one of the two points on the elliptic curve used by the elliptic curve adding step is one of the scalar multiple points stored in the table.

Here, the divisional information generation step may divide the secret information into the plurality of pieces of divisional information that each have a predetermined bit length.

Here, the positive integer may be an odd number.

Here, the divisional information generation step may generate a plurality of pieces of the divisional information, each being sw bits, the scalar multiple calculation step may execute (sw+1) calculation procedures, and when a piece of the divisional information w has a value other than 0 and the piece of divisional information w_is divisible by $2^t$ (t being a non-negative integer) and is not divisible by $2^{(t+1)}$, an (sw−t+1) th of the calculation procedures uses the elliptic curve adding step, and each other of the calculation procedures uses the elliptic curve doubling step.

Furthermore, the present invention is an integrated circuit in an elliptic curve calculation apparatus that executes scalar multiplication of an elliptic curve with respect to pre-given secret information and an input point on the elliptic curve, the integrated circuit including: a divisional information generation unit that divides the secret information to generate divisional information; an elliptic curve adding unit that generates a point obtained as a result of adding two points on the elliptic curve in a group of the elliptic curve; an elliptic curve doubling unit that generates a point obtained as a result of doubling one point on the elliptic curve in a group of the elliptic curve; and a scalar multiplication unit that uses the elliptic curve adding unit and the elliptic curve doubling unit to generate, based on a first point on the elliptic curve and the divisional information, a second point on the elliptic curve, wherein the scalar multiple calculation unit controls such that a value that is a total number of times the elliptic curve adding unit and the elliptic curve doubling unit is a constant number, without relying of information other than a bit length of the secret information, and each of the elliptic curve adding unit and the elliptic curve doubling unit has a multiplication unit that executes multiplication in a field of definition of the elliptic curve, a squaring unit that executes squaring in the field of definition, and an adding unit that executes addition in the field of definition, and the multiplication, the squaring and the addition are executed in the same order in the elliptic curve adding unit and the elliptic curve multiplication unit.

Here, the scalar multiple calculation unit may control such that, based on one piece of the divisional information, a value that is a total number of times the elliptic curve adding unit and the elliptic curve doubling unit are used is a constant number, without relying of information other than a bit length of the piece of divisional information.

(19) The present invention may be any combination of the above-described embodiment and modifications.

INDUSTRIAL APPLICABILITY

As has been described, the present invention is able to prevent security of information being reduced by simple power analysis.

The apparatuses, method and computer program of the present invention can be used for managerially, in other words, repeatedly and continuously, in an industry that requires information to be processed securely and reliably. Furthermore, the apparatuses of the present invention can be used for managerially, in other words, repeatedly and continuously, in an industry in which the playback apparatus is manufactured and sold.

The invention claimed is:

1. An information security apparatus that processes information securely and reliably using an elliptic curve calculation, such that security of the elliptic curve calculation is based on a discrete logarithm problem on an elliptic curve E defined over a residue field Fp with a prime p being a modulus, and such that the elliptic curve calculation is for calculating a point k*C by multiplying a point C on the elliptic curve E with a coefficient k that is a positive integer less than the prime p, the information security apparatus comprising:
   a point storage unit operable to store the point C on the elliptic curve E;
   a digit storage unit operable to store a value of each digit located at each of a plurality of digit positions of the coefficient k;
   an acquisition unit operable to acquire, from the digit storage unit, a value w of a digit located at one of the plurality of digit positions, the digit located at the one of the plurality of digit positions being an acquired digit;
   multiplication units equal in number to a number of types of possible values expressed by the acquired digit;
   a selection unit operable to select one of the multiplication units that corresponds to the acquired value w; and
   a repeat control unit operable to control the acquisition unit, the selection unit and the multiplication units, so as to repeatedly perform a procedure of acquiring the value w from among the plurality of digit positions of the coefficient k, selecting the one of the multiplication units that corresponds to the acquired value w, and multiplying in the selected multiplication unit, the procedure being repeated so as to be performed with respect to all digit positions of the plurality of digit positions of the coefficient k,
   wherein each of the multiplication units is operable to multiply the point C with the acquired value w, so as to obtain a multiplication result, and add the multiplication result in a position, corresponding to the digit position of the acquired value w, on the elliptic curve E, and
   wherein, when a non-negative integer t exists that fulfills a condition that the acquired value w_can be divided by $2^t$ and cannot be divided by $2^{t+1}$, the selected multiplication unit performs calculations that include, on the elliptic curve E, adding a point obtained by multiplying a point Q with $w/2^t$ or subtracting a point obtained by multiplying the point Q with $|w/2^t|$.

2. The information security apparatus of claim 1,
wherein the acquired digit is sw bits in length, and
wherein, when the non-negative integer t exists, the multiplication unit corresponding to the value w performs calculations (sw+1) times, an (sw−t+1)th of the (sw+1) calculations being the addition or the subtraction on the elliptic curve E, and each other of the (sw+1) calculations being a doubling on the elliptic curve E.

3. The information security apparatus of claim 2, further comprising a table generation unit operable to repeatedly perform a procedure of adding 2*Q to an addition point, the point Q being an initial addition point, to obtain a new addition point, so as to generate $2^{sw-1}$ addition points other than the point Q,
wherein, when the non-negative integer t exists, the multiplication unit corresponding to the value w uses the addition points generated by the table generation unit as points obtained by multiplying the point Q with $w/2^t$ or $|w/2^t|$.

4. The information security apparatus of claim 2,
wherein each digit is 3 bits in length,
wherein, when the value w_is 2, the corresponding multiplication unit performs doubling, doubling, addition, and doubling on the elliptic curve E in the stated order, the addition performed when the value w_is 2 being a calculation for adding the point C,
wherein, when the value w_is 4, the corresponding multiplication unit performs doubling, addition, doubling, and doubling on the elliptic curve E in the stated order, the addition performed when the value w_is 4 being a calculation for adding the point C, and
wherein, when the value w_is −2, the corresponding multiplication unit performs doubling, doubling, subtraction, and doubling on the elliptic curve E in the stated order, the subtraction performed when the value w_is −2 being a calculation for subtracting the point C.

5. The information security apparatus of claim 2, wherein wherein each digit is 4 bits in length,
wherein, when the value w_is 2, the corresponding multiplication unit performs doubling, doubling, doubling, addition, and doubling on the elliptic curve E in the stated order, the addition performed when the value w_is 2 being a calculation for adding the point C,
wherein, when the value w_is 4, the corresponding multiplication unit performs doubling, doubling, addition, doubling, and doubling on the elliptic curve E in the stated order, the addition performed when the value w_is 4 being a calculation for adding the point C,
wherein, when the value w_is 6, the corresponding multiplication unit performs doubling, doubling, doubling, addition, and doubling on the elliptic curve E in the stated order, the addition performed when the value w_is 6 being a calculation for adding a point 3*C,
wherein, when the value w_is 8, the corresponding multiplication unit performs doubling, addition, doubling, doubling, and doubling on the elliptic curve E in the stated order, the addition performed when the value w_is 8 being a calculation for adding the point the point C,
wherein, when the value w_is −6, the corresponding multiplication unit performs doubling, doubling, doubling, subtraction, and doubling on the elliptic curve E in the stated order, the subtraction performed when the value w_is −6 being a calculation for subtracting the point 3*C,
wherein, when the value w_is −4, the corresponding multiplication unit performs doubling, doubling, subtraction, doubling, and doubling on the elliptic curve E in the stated order, the subtraction performed when the value w_is −4 being a calculation for subtracting the point C, and
wherein, when the value w_is −2, the corresponding multiplication unit performs doubling, doubling, doubling, subtraction, and doubling on the elliptic curve E in the stated order, the subtraction performed when the value w_is −2 being a calculation for subtracting the point C.

6. The information security apparatus of claim 2, wherein each of the addition or subtraction and the doublings includes a dummy calculation, such that the addition or subtraction and the doublings execute a same type of calculations in a same order.

7. The information security apparatus of claim 1,
wherein, when the non-negative integer t exists and the acquired digit is a bits in length, the multiplication unit corresponding to the value w performs calculations (a+1) times successively, an (a−t+1)th of the (a+1) calculations being the addition or the subtraction on the elliptic curve E, and each other of the (a+1) calculations being a doubling on the elliptic curve E, and
wherein, when the non-negative integer t exists and the acquired digit is b bits in length, the multiplication unit corresponding to the value w performs calculations (b+1) times successively, a (b−t+1)th of the (b+1) calculations being the addition or the subtraction on the elliptic curve E, and each other of the (b+1) calculations being a doubling on the elliptic curve E.

8. The information security apparatus of claim 1, wherein the information security apparatus is an encryption apparatus that encrypts information using the elliptic curve calculation that calculates the point k*C.

9. The information security apparatus of claim 1, wherein the information security apparatus is a decryption apparatus that decrypts encrypted information using the elliptic curve calculation that calculates the point k*C.

10. The information security apparatus of claim 1, wherein the information security apparatus is a digital signature generation apparatus that subjects information to a digital signature using the elliptic curve calculation that calculates the point k*C.

11. The information security apparatus of claim 1, wherein the information security apparatus is a digital signature verification apparatus that performs verification of a digital signature using the elliptic curve calculation that calculates the point k*C.

12. The information security apparatus of claim 1, wherein the information security apparatus is a key sharing apparatus that generates a shared key with another key sharing apparatus, using the elliptic curve calculation that calculates the point k*C.

13. An elliptic curve calculation apparatus that processes information securely and reliably using an elliptic curve calculation, such that security of the elliptic curve calculation is based on a discrete logarithm problem on an elliptic curve E defined over a residue field Fp with a prime p being a modulus, and such that the elliptic curve calculation is for calculating a point k*C by multiplying a point C on the elliptic curve E with a coefficient k that is a positive integer less than the prime p, the elliptic curve calculation apparatus comprising:
a point storage unit operable to store the point C on the elliptic curve E;
a digit storage unit operable to store a value of each digit located at each of a plurality of digit positions of the coefficient k;

an acquisition unit operable to acquire, from the digit storage unit, a value w of a digit located at one of the plurality of digit positions, the digit located at the one of the plurality of digit positions being an acquired digit;

multiplication units equal in number to a number of types of possible values expressed by the acquired digit;

a selection unit operable to select one of the multiplication units that corresponds to the acquired value w; and a repeat control unit operable to control the acquisition unit, the selection unit and the multiplication units so as to repeatedly perform a procedure of acquiring the value w from among the plurality of digit positions of the coefficient k, selecting the one of the multiplication units that corresponds to the acquired value w, and multiplying in the selected multiplication unit, the procedure being repeated so as to be performed with respect to all digit positions of the plurality of digit positions of the coefficient k, wherein each of the multiplication units is operable to multiply the point C with the acquired value w, so as to obtain a multiplication result, and add the multiplication result in a position, corresponding to the digit position of the acquired value on the elliptic curve E, and wherein, when a non-negative integer t exists that fulfills a condition that the acquired value w_can be divided by $2^t$ and cannot be divided by $2^{t+1}$, the selected multiplication unit performs calculations that include, on the elliptic curve E, adding a point obtained by multiplying a point Q with $w/2^t$ or subtracting a point obtained by multiplying the point Q with $|w/2^t|$.

14. An integrated circuit that processes information securely and reliably using an elliptic curve calculation, such that security of the elliptic curve calculation is based on a discrete logarithm problem on an elliptic curve E defined over a residue field Fp with a prime p being a modulus, and such that the elliptic curve calculation is for calculating a point k*C by multiplying a point C on the elliptic curve E with a coefficient k that is a positive integer less than the prime p, the integrated circuit comprising:

a point storage unit operable to store the point C on the elliptic curve E;

a digit storage unit operable to store a value of each digit located at each of a plurality of digit positions of the coefficient k;

an acquisition unit operable to acquire, from the digit storage unit, a value w of a digit located at one of the plurality of the digit positions, the digit located at the one of the plurality of digit positions being an acquired digit;

multiplication units equal in number to a number of types of possible values expressed by the acquired digit;

a selection unit operable to select one of the multiplication units that corresponds to the acquired value w; and a repeat control unit operable to control the acquisition unit, the selection unit and the multiplication units, so as to repeatedly perform a procedure of acquiring the value w from among the plurality of digit positions of the coefficient k, selecting the one of the multiplication units that corresponds to the acquired value w, and multiplying in the selected multiplication unit, the procedure being repeated so as to be performed with respect to all digit positions of the plurality of digit positions of the coefficient k, wherein each of the multiplication units is operable to multiply the point C with the acquired value w, so as to obtain a multiplication result, and add the multiplication result in a position, corresponding to the digit position of the acquired value w, on the elliptic curve E, and wherein, when a non-negative integer t exists that fulfills a condition that the acquired value w_can be divided by $2^t$ and cannot be divided by $2^{t+1}$, the selected multiplication unit performs calculations that include, on the elliptic curve E, adding a point obtained by multiplying a point Q with $w/2^t$ or subtracting a point obtained by multiplying the point Q with $|w/2^t|$.

15. A method used in an information security apparatus that processes information securely and reliably using an elliptic curve calculation, such that security of the elliptic curve calculation is based on a discrete logarithm problem on an elliptic curve E defined over a residue field Fp with a prime p being a modulus, and such that the elliptic curve calculation is for calculating a point k*C by multiplying a point C on the elliptic curve E with a coefficient k that is a positive integer less than the prime p, wherein the information security apparatus includes:

a point storage unit operable to store the point C on the elliptic curve E; and a digit storage unit operable to store a value of each digit located at each of a plurality of digit positions of the coefficient k, wherein the method comprises:

an acquisition step of acquiring, from the digit storage unit, a value w of a digit located at one of the plurality of digit positions, the digit located at the one of the plurality of digit positions being an acquired digit;

multiplication steps equal in number to a number of types of possible values expressed by the acquired digit;

a selection step of selecting one of the multiplication steps that corresponds to the acquired value w; and a repeat control step of controlling the acquisition step, the selection step and the multiplication steps, so as to repeatedly perform a procedure of acquiring the value w from among the plurality of digit positions of the coefficient k, selecting the one of the multiplication steps that corresponds to the acquired value w, and multiplying in the selected multiplication step, the procedure being repeated so as to be performed with respect to all digit positions of the plurality of digit positions of the coefficient k, wherein each of the multiplication steps is for multiplying the point C with the acquired value w, so as to obtain a multiplication result, and adding the multiplication result in a position, corresponding to the digit position of the acquired value w, on the elliptic curve E, and wherein, when a non-negative integer t exists that fulfills a condition that the acquired value w_can be divided by $2^t$ and cannot be divided by $2^{t+1}$, the selected multiplication step performs calculations that include, on the elliptic curve E, adding a point obtained by multiplying a point Q with $w/2^t$ or subtracting a point obtained by multiplying the point Q with $|w/2^t|$.

16. A non-transitory computer-readable recording medium having a computer program recorded thereon, the computer program being used in an information security apparatus that processes information securely and reliably using an elliptic curve calculation, such that security of the elliptic curve calculation is based on a discrete logarithm problem on an elliptic curve E defined over a residue field Fp with a prime p being a modulus, and such that the elliptic curve calculation is for calculating a point k*C by multiplying a point C on the elliptic curve E with a coefficient k that is a positive integer less than the prime p, wherein the information security apparatus includes:
  a point storage unit operable to store the point C on the elliptic curve E; and
  a digit storage unit operable to store a value of each digit located at each of a plurality of digit positions,
wherein the computer program causes the information security apparatus to execute a method comprising:
  an acquisition step of acquiring, from the digit storage unit, a value w of a digit located at one of the plurality of digit positions, the digit located at the one of the plurality of digit positions being an acquired digit;
  multiplication steps equal in number to a number of types of possible values expressed by the acquired digit;
  a selection step of selecting one of the multiplication steps that corresponds to the acquired value w; and
  a repeat control step of controlling the acquisition step, the selection step and the multiplication steps, so as to repeatedly perform a procedure of acquiring the value w from among the plurality of digit positions of the coefficient k, selecting the one of the multiplication steps that corresponds to the acquired value w, and multiplying in the selected multiplication step, the procedure being repeated so as to be performed with respect to all digit positions of the plurality of digit positions of the coefficient k,
wherein each of the multiplication steps is for multiplying the point C with the acquired value w, so as to obtain a multiplication result, and adding the multiplication result in a position, corresponding to the digit position of the acquired value w, on the elliptic curve E, and
wherein, when a non-negative integer t exists that fulfills a condition that the acquired value w_can be divided by $2^t$ and cannot be divided by $2^{t+1}$, the selected multiplication step performs calculations that include, on the elliptic curve E, adding a point obtained by multiplying a point Q with $w/2^t$ or subtracting a point obtained by multiplying the point Q with $|w/2^t|$.

* * * * *